(12) United States Patent
Koyama et al.

(10) Patent No.: US 8,707,516 B2
(45) Date of Patent: Apr. 29, 2014

(54) COUPLING DEVICE AND ELECTRONIC DEVICE

(75) Inventors: Yutaka Koyama, Tachikawa (JP); Yasuhiko Kawasaki, Hino (JP)

(73) Assignee: NEC Corporation, Tokyo (JP)

( * ) Notice: Subject to any disclaimer, the term of this patent is extended or adjusted under 35 U.S.C. 154(b) by 1121 days.

(21) Appl. No.: 12/352,466

(22) Filed: Jan. 12, 2009

(65) Prior Publication Data

US 2009/0178240 A1 Jul. 16, 2009

(30) Foreign Application Priority Data

Jan. 10, 2008 (JP) .................................. 2008-003278
Dec. 10, 2008 (JP) .................................. 2008-315115

(51) Int. Cl.
*E05D 11/00* (2006.01)

(52) U.S. Cl.
USPC ..................... 16/223; 379/433.13; 455/575.3; 16/250

(58) Field of Classification Search
USPC ........... 16/223, 250–251, 221, 386, 342, 354; 277/550; 379/433.13; 455/575.3; 361/679.27

See application file for complete search history.

(56) References Cited

U.S. PATENT DOCUMENTS

| | | | | | |
|---|---|---|---|---|---|
| 3,422,486 | A | * | 1/1969 | Thomas, Jr. | 16/251 |
| 4,254,532 | A | * | 3/1981 | Hager | 16/20 |
| 4,835,905 | A | * | 6/1989 | Lasier et al. | 49/14 |
| 5,163,204 | A | * | 11/1992 | Jackson | 16/84 |
| 5,991,975 | A | * | 11/1999 | Baer | 16/354 |

FOREIGN PATENT DOCUMENTS

| | | |
|---|---|---|
| JP | 2001-136252 | 5/2001 |
| JP | 2004-153597 | 5/2004 |
| JP | 2004-161473 | 6/2004 |
| JP | 2006-345283 | 12/2006 |
| WO | WO 98/29630 | 7/1998 |

* cited by examiner

*Primary Examiner* — William Miller
(74) *Attorney, Agent, or Firm* — Cozen O'Connor

(57) ABSTRACT

A coupling device for coupling a first casing and a second casing in a movable manner, comprising a first coupling member provided at the first casing, a second coupling member provided at the second casing, and coupled to the first coupling member in such a way that the first casing and the second casing move relative to each other, and a cleaning mechanism that cleans a clearance between the first casing and the second casing or the second coupling member. The cleaning mechanism has a wiper blade that moves in the clearance with movement of the casings, air injection means that injects air to the clearance, and/or a hinge cover that is displaceable within the clearance.

1 Claim, 34 Drawing Sheets

FIG.16
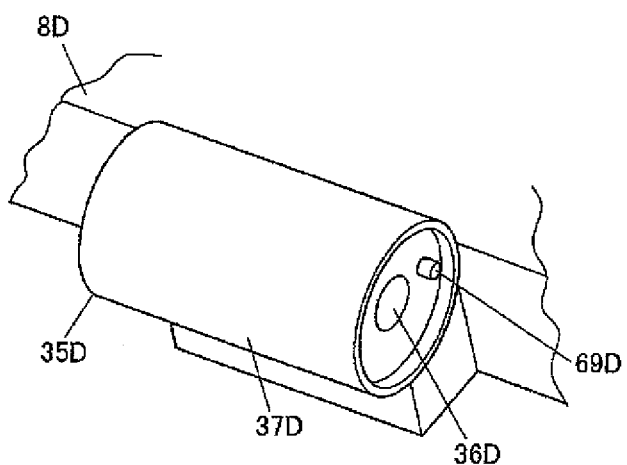
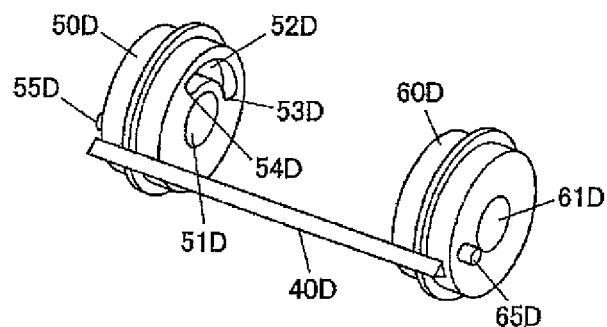
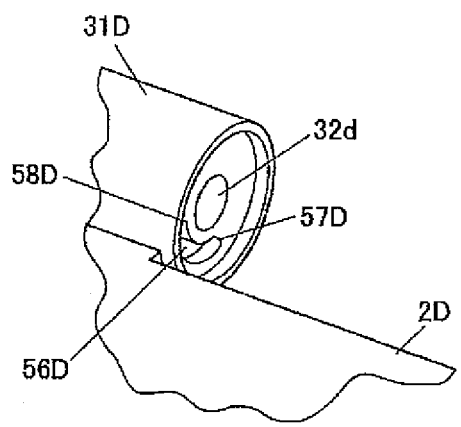

FIG.17
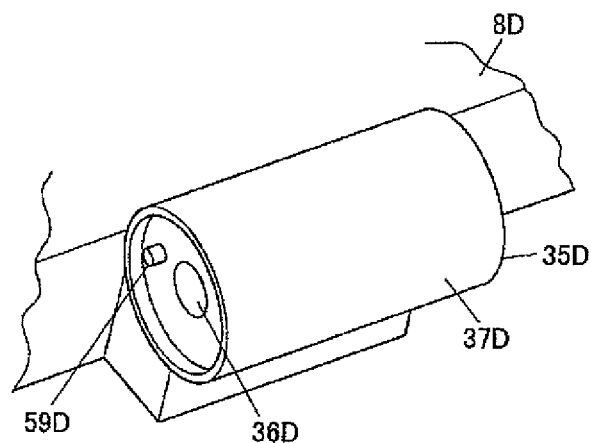
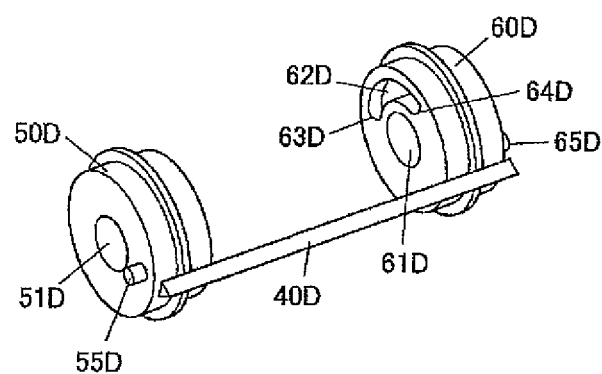
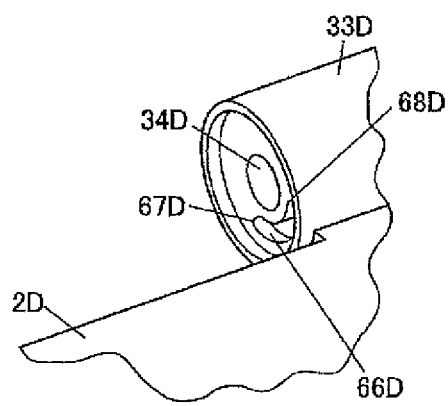

COUPLING DEVICE AND ELECTRONIC DEVICE

BACKGROUND OF THE INVENTION

1. Field of the Invention

The present invention relates to a coupling device and an electronic device.

2. Description of the Related Art

There are various types of cellular phones. For example, Unexamined Japanese Patent Application KOKAI Publication No. 2001-136252 discloses a foldable type which has two casings coupled together by a hinge unit. In addition, there are a straight slide type having two casings coupled to be slidable linearly, and a rotary slide type having two casings coupled to be slidable arcuately.

A foreign matter, such as dust or sands, is likely to enter the clearance of the coupled section of an electronic device including a cellular phone having two casings coupled together. When the two casings are moved with a foreign matter having entered therein, the foreign matter damages the casings and/or the coupled section.

SUMMARY OF THE INVENTION

Accordingly, it is an object of the present invention to suppress foreign-matter-oriented damages at the coupled section of an electronic device.

To achieve the object, according to the present invention, there is provided a coupling device for coupling a first casing and a second casing in a movable manner, including:

a first coupling member provided at the first casing;

a second coupling member provided at the second casing, and coupled to the first coupling member in such a way that the first casing and the second casing move relative to each other; and a cleaning mechanism that cleans a clearance between the first casing and the second casing or the second coupling member.

Furthermore, an electronic device comprising the coupling member, the first casing and the second casing, which are as described above, is provided.

BRIEF DESCRIPTION OF THE DRAWINGS

This object and other objects and advantages of the present invention will become more apparent upon reading of the following detailed description and the accompanying drawings in which:

FIG. 5A is an exploded perspective view showing the electronic device according to the third embodiment;

FIG. 5B is a perspective view showing a hinge rubber of the electronic device according to the third embodiment;

FIG. 16 is an exploded perspective view showing a hinge structure of the electronic device according to the filth embodiment;

FIG. 17 is an exploded perspective view showing the hinge structure of the electronic device according to the fifth embodiment;

DETAILED DESCRIPTION OF THE PREFERRED EMBODIMENTS

Preferred embodiments for carrying out the present invention will be described with reference to the accompanying drawings. Each of the embodiments to be described hereunder is an electronic device having a cleaning mechanism for removing a foreign matter from the electronic device. While embodiments of the present invention described below have various technically preferable restrictions for carrying out the invention, the technical scope of the invention is not in any way limited to the following embodiments and illustrated examples.

First Embodiment

Figure 1:
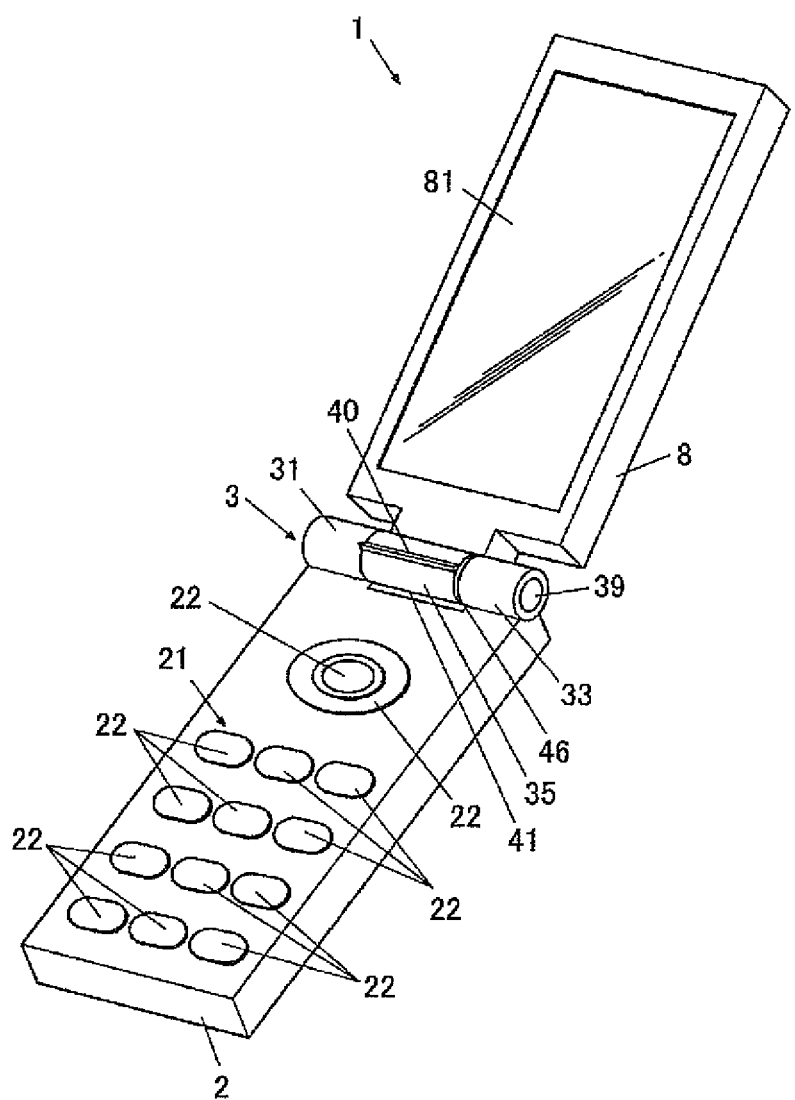
FIG. 1 is a perspective view showing an electronic device according to a first embodiment of the present invention.

FIG. 1 is a perspective view showing an electronic device 1.

The electronic device 1 is a cellular phone. In the electronic device 1, a first casing 2 is coupled to a second casing 8 by a hinge structure 3. An operational unit 21 is provided on the front side of the first casing 2. The operational unit 21 has a plurality of key tops 22, and push switches or the like corresponding to the key tops 22. A display unit 81 having a liquid crystal display, an organic EL display panel, or the like is provided on the front side of the second casing 8.

The hinge structure 3 makes the second casing 8 relatively rotatable to the first casing 2. Specifically, the rotations of the first casing 2 and the second casing 8 by the hinge structure 3 sets the first casing 2 and the second casing 8 closed with the front side of the first casing 2 facing the front side of the second casing 8, and sets the first casing 2 and the second casing 8 open with the front sides of the first casing 2 and the second casing 8 facing frontward.

Figure 2:
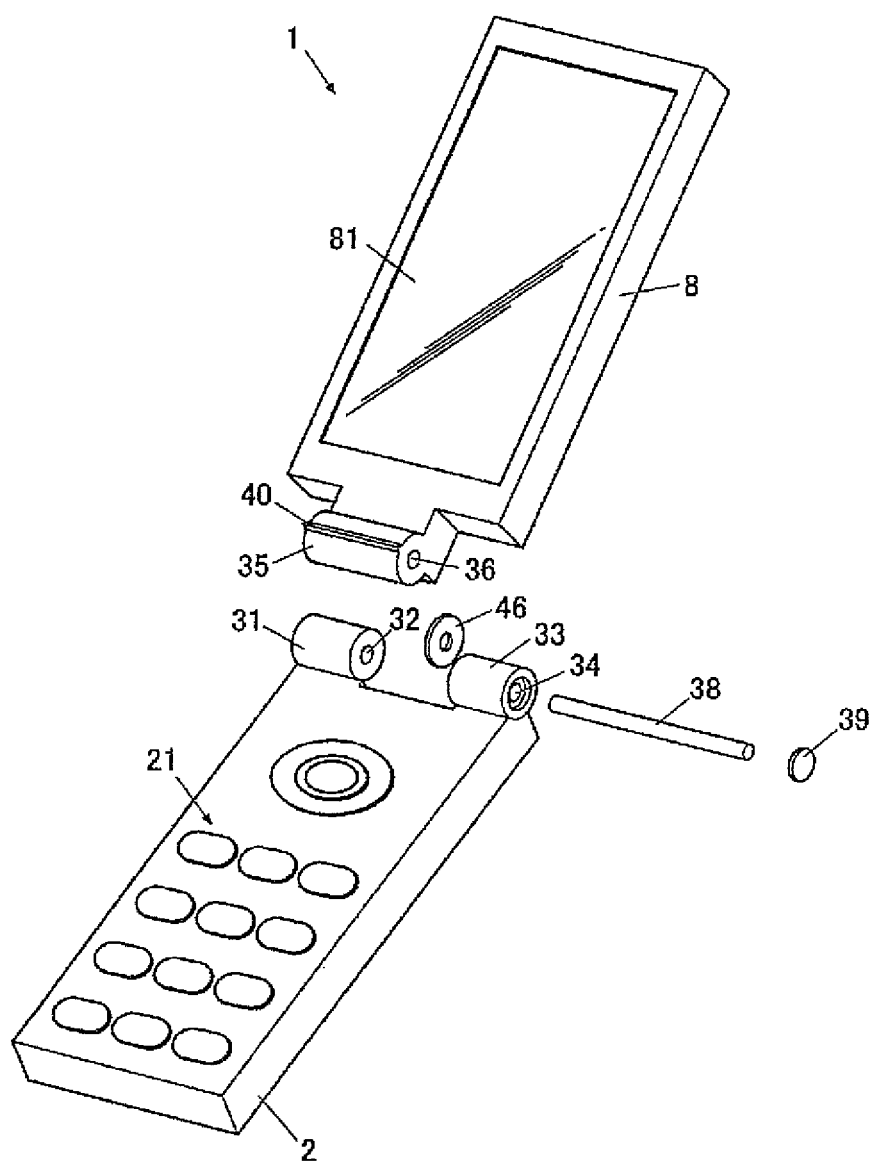
FIG. 2 is an exploded perspective view showing the electronic device according to the first embodiment.
Figure 3:
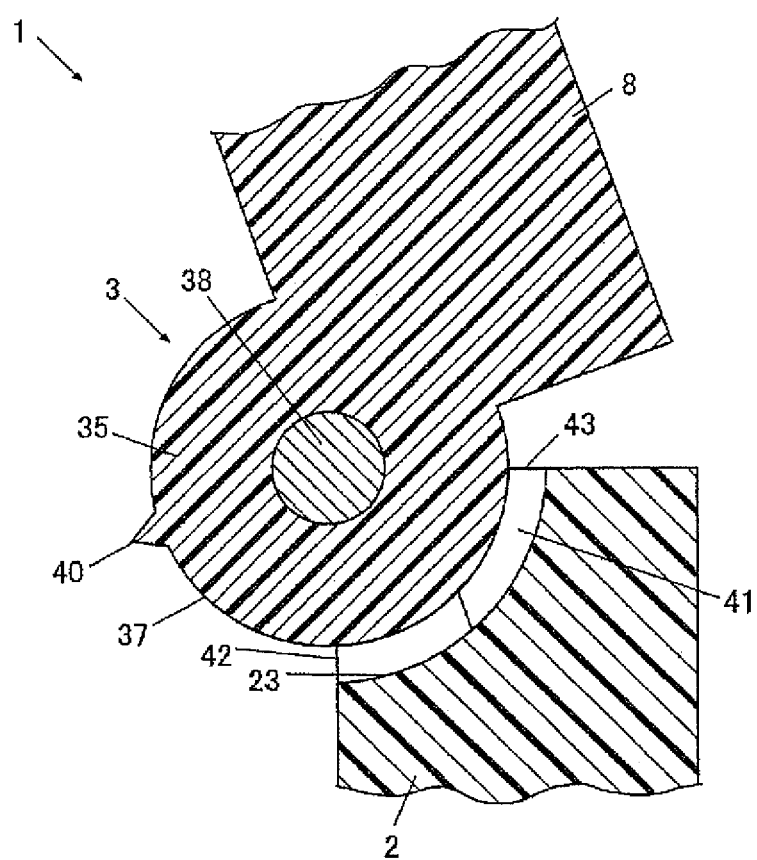
FIG. 3 is a cross-sectional view showing a hinge structure of the electronic device according to the first embodiment.

The details of the hinge structure 3 will be described. FIG. 2 is an exploded perspective view showing the hinge structure 3 broken down to the first casing 2 and the second casing 8 set apart from each other. FIG. 3 is a cross-sectional view showing that surface of the hinge structure 3 which is perpendicular to a pivot 38 thereof.

As shown in FIGS. 2 and 3, the hinge structure 3 has two first rotational members 31, 33 provided at the first casing 2, a second rotational member 35 provided at the second casing 8, the pivot 38 put through those rotational members 31, 33, 35, a ring-shaped rubber 46 through which the pivot 38 is placed, a wiper blade 40 protrusively provided on the circumferential surface of the second rotational member 35, and a cover 39 which closes a shaft hole 34 of the first rotational member 33 from the side. The first rotational members 31, 33 are first coupling members while the second rotational member 35 is a second coupling member.

One of the first rotational members, 31, is provided at the upper end portion of the first casing 2 on the left-hand side, while the other first rotational member 33 is provided at the upper end portion of the first casing 2 on the right-hand side.

The first rotational members 31, 33 are made integral with the first casing 2, or are attached to the first casing 2. The first rotational members 31, 33 respectively have shaft holes 32, 34 formed therein in parallel to the width direction of the first casing 2. The shaft holes 32, 34 are concentric to each other.

The second rotational member 35 is provided at the lower end portion of the second casing 8 in the center portion thereof in the horizontal direction thereof. The second rotational member 35 is made integral with the second casing 8, or is attached to the second casing 8. The second rotational member 35 has a shaft hole 36 formed therein in parallel to the width direction of the second casing 8. A circumferential surface 37 of the second rotational member 35 serves as a cylindrical surface with the axial line of the shaft hole 36 being the center.

The pivot 38 is placed through the shaft hole 34 from the right side of the first rotational member 33, is further placed through the shaft hole 36 of the second rotational member 35, and is further placed through the shaft hole 32 of the first rotational member 31. Those first rotational members 31, 33, 35 are pivotally supported by the pivot 38. This pivot 38 allows the second rotational member 35 to be coupled to the first rotational members 31, 33 in such a way as to be rotatable about the axial center of the pivot 38 with respect to the first rotational members 31, 33. Accordingly, the second rotational member 35 is coupled to the first casing 2 via the pivot 38 and the first rotational members 31, 33, so that the second rotational member 35 is rotatable relative to the first casing 2. The pivot 38 may be fixed to either one of the first rotational members 31, 33, and the second rotational member 35. Further, two pivots may be used so that one pivot allows the first rotational member 31 and the second rotational member 35 to be coupled in a rotatable manner, while the other pivot allows the first rotational member 33 and the second rotational member 35 to be coupled in a rotatable manner. In addition, one of the two rotary sections of a hinge unit which are coupled together in a rotatable manner may be fitted in the shaft hole 32 of the first rotational member 31, the other rotary section may be fitted in a shaft hole 36 of the second rotational member 35, and the first rotational member 33 and the second rotational member 35 may be coupled together by the pivot 38.

The pivot 38 is put through a ring-shaped rubber 46 between the first rotational member 33 and the second rotational member 35 between which the rubber 46 is held. The rubber 46 fills the clearance between the first rotational member 33 and the second rotational member 35 to cancel the clearance between the first rotational member 31 and the second rotational member 35. The rubber 46 may be compressed by the first rotational member 33 and the second rotational member 35. A rubber similar to the rubber 46 may be held between the first rotational member 33 and the second rotational member 35.

A recessed cylindrical surface 23 is formed at the upper end portion of the first casing 2 between the first rotational members 31, 33. The cylindrical surface 23 is a cylindrical surface with the shaft holes 32, 34 being the center. With the second rotational member 35 being coupled to the first rotational members 31, 33 by the pivot 38, the circumferential surface 37 of the second rotational member 35 extends along the cylindrical surface 23. Accordingly, the second rotational member 35 is a coupling member which is movable relative to the first casing 2 along the cylindrical surface 23 which is a part of the top surface of the first casing 2.

A clearance 41 is formed between the circumferential surface 37 of the second rotational member 35 and the cylindrical surface 23. The clearance 41 is open to the front side of the first casing 2, as well as to the upper end side of the first casing 2.

A wiper blade 40 is protrusively provided on the circumferential surface 37 of the second rotational member 35. The wiper blade 40 is a projection extending in parallel to the axial center of the shaft hole 36, and is formed across the second rotational member from the left end thereof to the right end thereof. The providing location of the wiper blade 40 is on the front side with the first casing 2 and the second casing 8 being open. If the height of the wiper blade 40 from the circumferential surface 37 of the second rotational member 35 as a reference position is equal to the width of the clearance 41, the top portion of the wiper blade 40 contacts the cylindrical surface 23 of the first casing 2 with the wiper blade 40 being in the clearance 41. The wiper blade 40 may be provided wherever on the circumferential surface of the second rotational member 35 the wiper blade 40 moves on the cylindrical surface 23 when the first casing 2 and the second casing 8 are opened or closed.

In the electronic device 1 configured in the foregoing manner, when a user closes the first casing 2 and the second casing 8, the wiper blade 40 enters a front opening 42 of the clearance 41 so that a foreign matter having entered the clearance 41 is wiped out through an upper opening 43 of the clearance 41. With the first casing 2 and the second casing 8 being closed with the front side of the first casing 2 facing the front side of the second casing 8, the wiper blade 40 is positioned at the upper opening 43 to block the opening 43, or is positioned out of the clearance 41 through the upper opening 43. When the user opens the first casing 2 and the second casing 8, on the other hand, a foreign matter having entered the clearance 41 is wiped out through the front opening 42 of the clearance 41.

As apparent from the above, even when a foreign matter, such as dust or sands, enters the clearance 41 formed between the first casing 2 and the second rotational member 35, the foreign matter can be cleaned out when the casings 2, 8 are moved relative to each other, thus preventing the top surfaces of the first casing 2 and the second rotational member 35 from being damaged.

It is to be noted that cylindrical recessed surfaces with the center line of the shaft hole 36 being the center may be respectively formed at the lower end portion of the second casing 8 on both right and left sides of the second rotational member 35, the circumferential surfaces of the first rotational members 31, 33 may extend along the recessed surfaces, clearances may be formed between the circumferential surfaces of the first rotational members 31, 33 and the recessed surfaces, and wiper blades may be protrusively provided on the circumferential surfaces of the first rotational members 31, 33. According to the modification, as the user opens/closes the first casing 2 and the second casing 8, a foreign matter, if entering in the clearances formed between the first rotational members 31, 33 and the second casing 8, can be wiped out with the wiper blades protrusively provided on the circumferential surfaces of the first rotational members 31, 33.

The wiper blade 40 may not be formed integral with the second rotational member 35, but may be a brush or rubber elastic member attached to the second rotational member 35.

Second Embodiment

Figure 4:
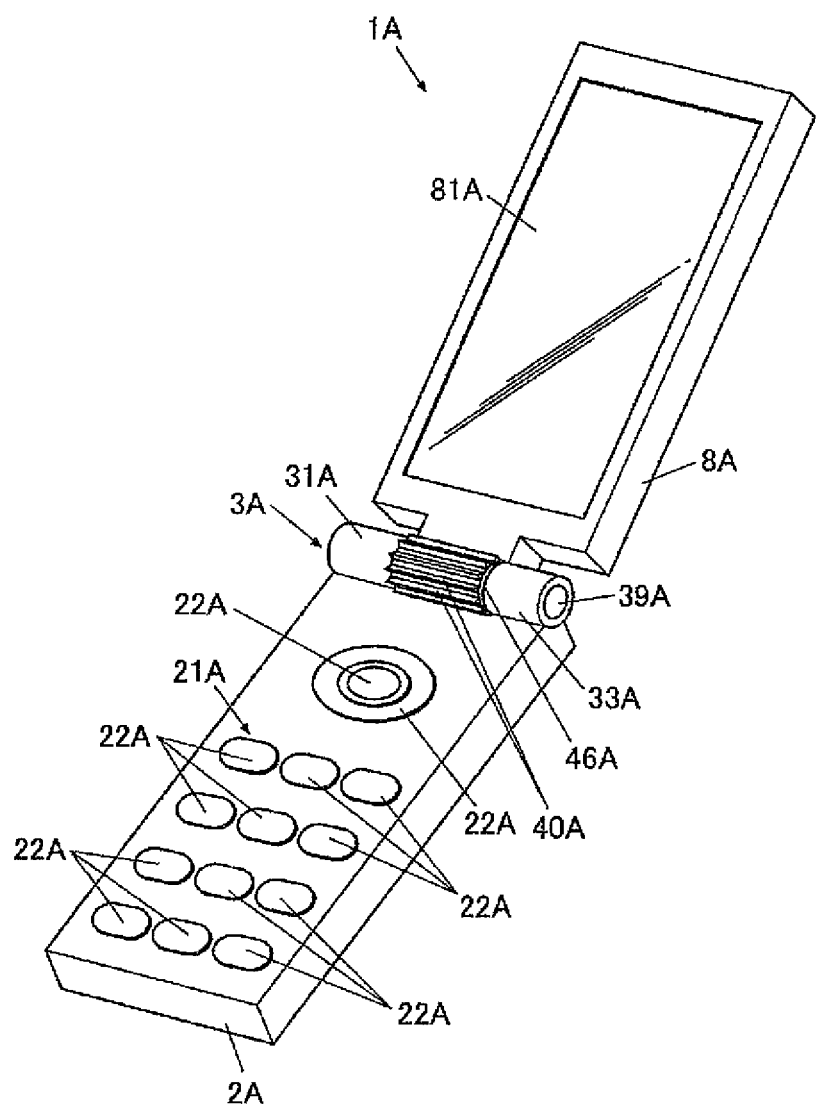
FIG. 4 is a perspective view showing an electronic device according to a second embodiment of the invention.
Figure 5:
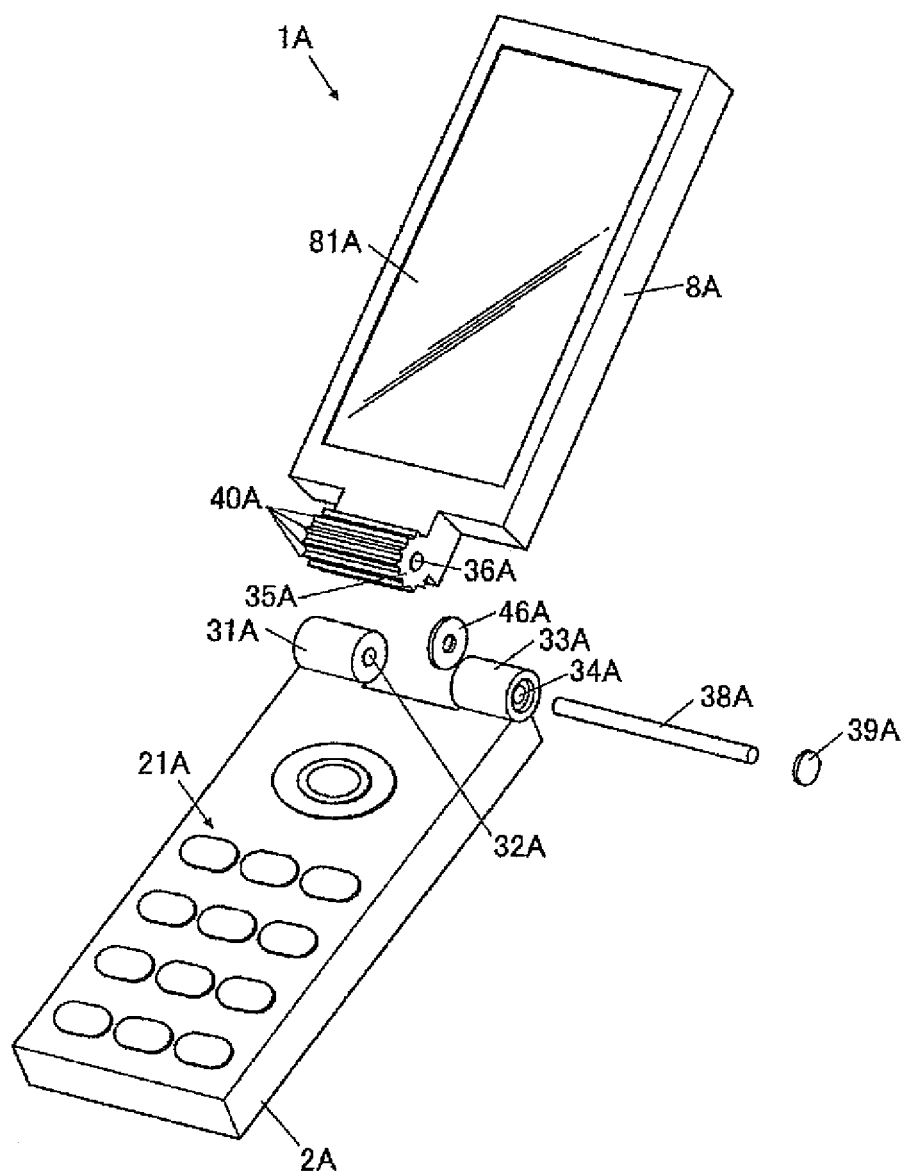
FIG. 5 is an exploded perspective view showing the electronic device according to the second embodiment.
Figure 6:
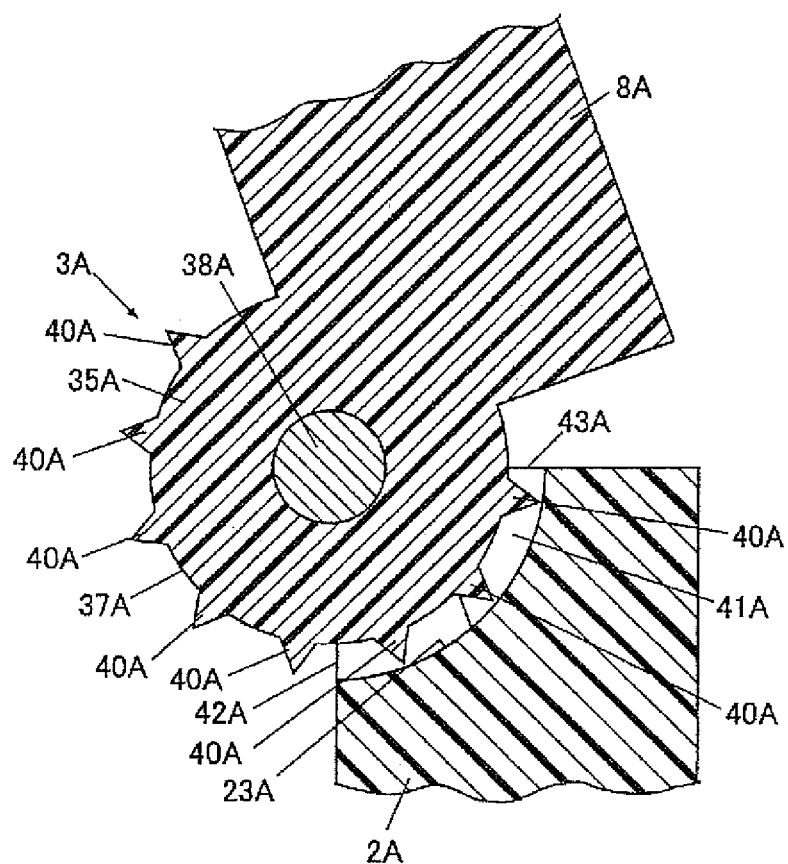
FIG. 6 is a cross-sectional view showing a hinge structure of the electronic device according to the second embodiment.

FIG. 4 is a perspective view showing an electronic device 1A. FIG. 5 is an exploded perspective view showing a hinge structure 3A broken-down to a first casing 2A and a second casing 8A set apart from each other. FIG. 6 is a cross-sectional view showing that surface of the hinge structure 3A which is perpendicular to a pivot 38A thereof. Common numerals are given to the individual components of the electronic device 1A according to the second embodiment equivalent to those of the electronic device 1 according to the first embodiment with the letter "A" suffixed to the common numerals of the individual components of the electronic device 1A according to the second embodiment.

In the electronic device 1A according to the second embodiment, a plurality of wiper blades 40A are protrusively provided on a circumferential surface 37A of the second rotational member 35A. Those wiper blades 40A provided in parallel to the axial center of an shaft hole 36A across the second rotational member 35A from the left end thereof to the right end thereof. The wiper blades 40A are arranged in the circumferential direction of the second rotational member 35A. The provision of the wiper blades 40A can allow a foreign matter to be wiped out and can suppress intrusion of a foreign matter regardless of the degree of opening of the second casing 8A with respect to the first casing 2A.

The individual components of the electronic device 1A according to the second embodiment are configured like the corresponding components of the electronic device 1 according to the first embodiment, except that a plurality of wiper blades 40A are provided at the second rotational member 35A.

Third Embodiment

Figure 7:
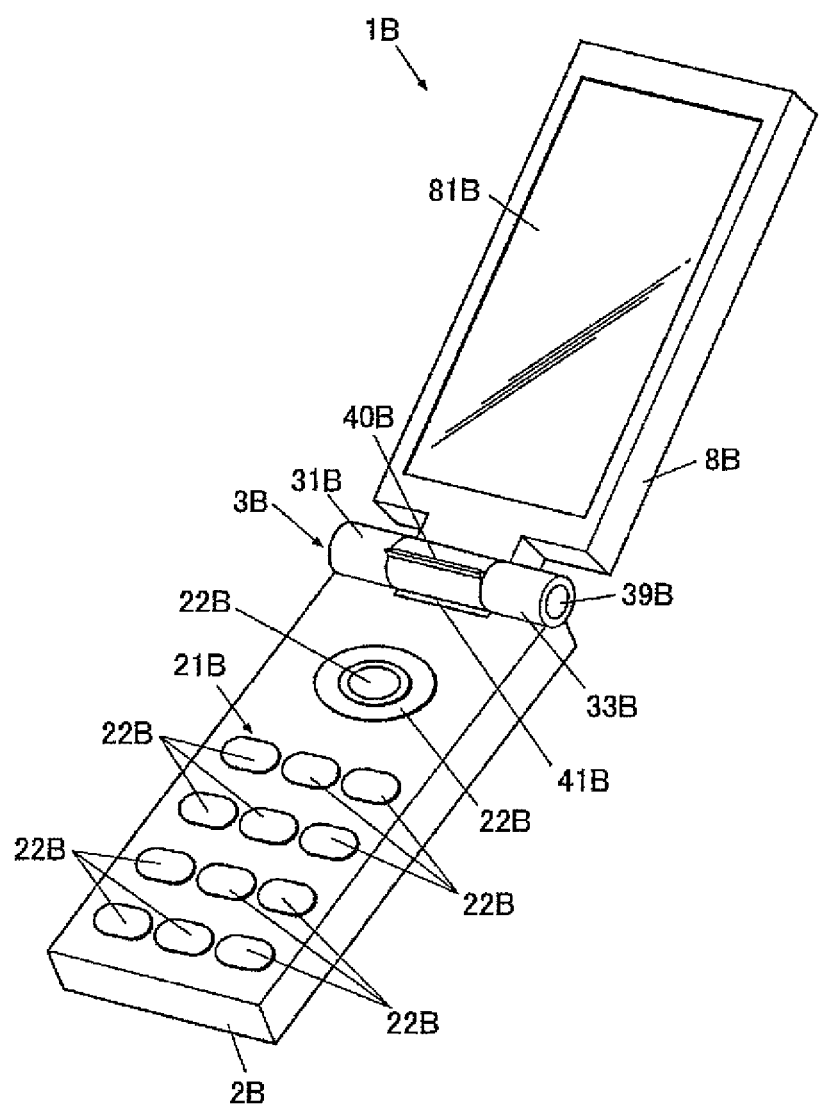
FIG. 7 is a perspective view showing an electronic device according to a third embodiment of the invention.
Figure 8A:
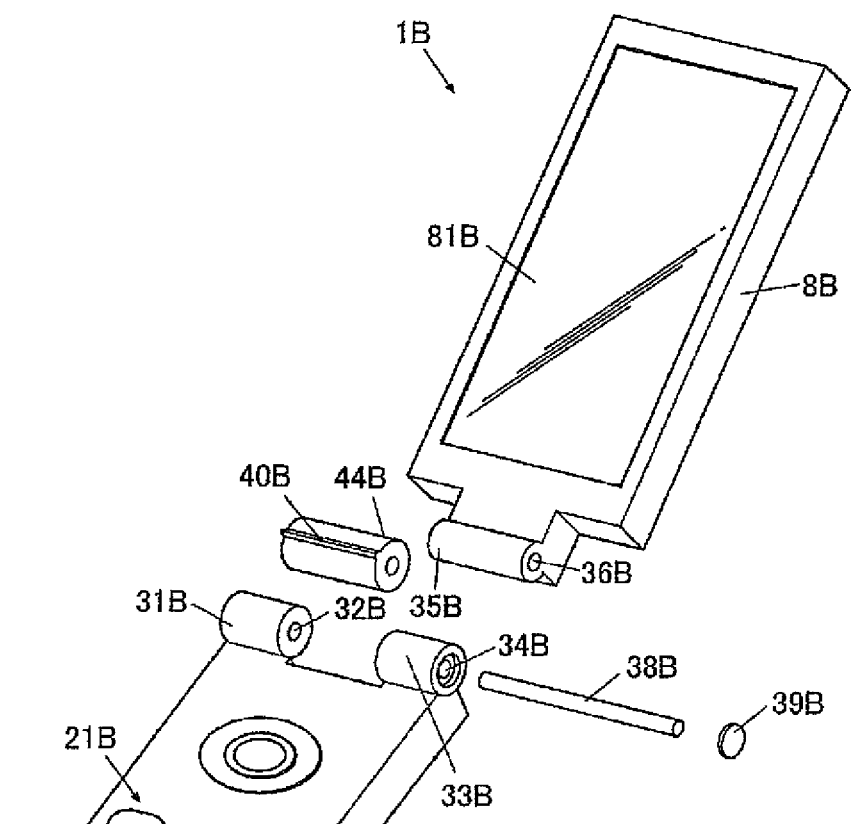
Figure 8B:
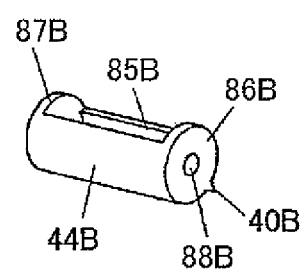
Figure 9:
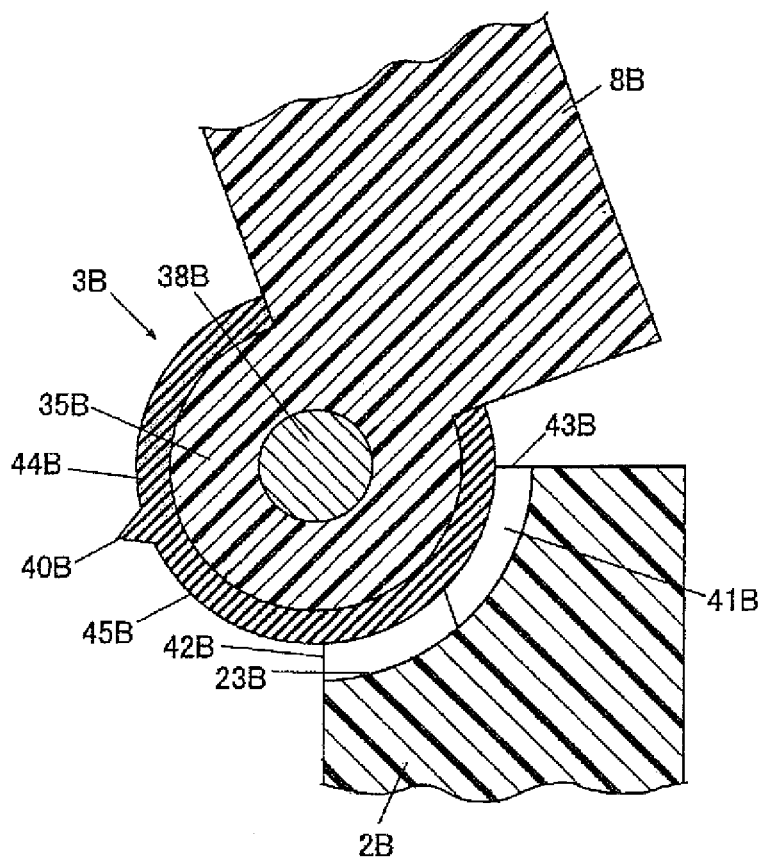
FIG. 9 is a cross-sectional view showing a hinge structure of the electronic device according to the third embodiment.

FIG. 7 is a perspective view showing an electronic device 1B. FIG. 8A is an exploded perspective view showing a hinge structure 3B broken-down to a first casing 2B and a second casing 8B set apart from each other, FIG. 8B is a perspective view showing a hinge rubber 44B of the hinge structure 3B, and FIG. 9 is a cross-sectional view showing that surface of the hinge structure 3B which is perpendicular to a pivot 38B thereof. Common numerals are given to the individual components of the electronic device 1B according to the third embodiment equivalent to those of the electronic device 1 according to the first embodiment with the letter "B" suffixed to the common numerals of the individual components of the electronic device 1B according to the third embodiment.

While the wiper blade 40 is formed integral with the second rotational member 35 according to the first embodiment, a wiper blade 40B is provided at the hinge rubber 44B and is not formed integral with a second rotational member 35B. Retaining space 80B is formed in the hinge rubber 44B, so that the second rotational member 35B is retained in the retaining space 80B with the hinge rubber 44B enclosing the second rotational member 35B. With the hinge rubber 44B attached to the second rotational member 35B, a circumferential surface 45B of the hinge rubber 44B extends along a cylindrical surface 23B of the first casing 2B, forming a clearance 41B between the circumferential surface 45B of the hinge rubber 44B and the cylindrical surface 23B.

The wiper blade 40B is protrusively provided on the circumferential surface 45B of the hinge rubber 44B. The wiper blade 40B is formed integral with the hinge rubber 44B, and the wiper blade 40B and hinge rubber 44B are made of rubber elastic material. Even if a foreign matter enters between the wiper blade 40B and the cylindrical surface 23B of the first casing 2, the wiper blade 40B which is rubber elastic member deforms to prevent the wiper blade 40B and the cylindrical surface 23B from being damaged by a foreign matter.

While no rubber intervenes between the first rotational member 33B and the second rotational member 35B, an end face 81B of the hinge rubber 44B is held between the first rotational member 31B and the second rotational member 35B, and an opposite end face 82B of the hinge rubber 44B is held between the first rotational member 33B and the second rotational member 35B. This prevents a foreign matter from entering between the first rotational members 31B, 33B and the second rotational member 35B. A shaft hole 83B is formed in the end faces 81B, 82B, and a pivot 38B is put through the shaft hole 83B.

The individual components of the electronic device 1B according to the third embodiment are configured like the corresponding components of the electronic device 1 according to the first embodiment, except for the foregoing configuration.

Fourth Embodiment

Figure 10:
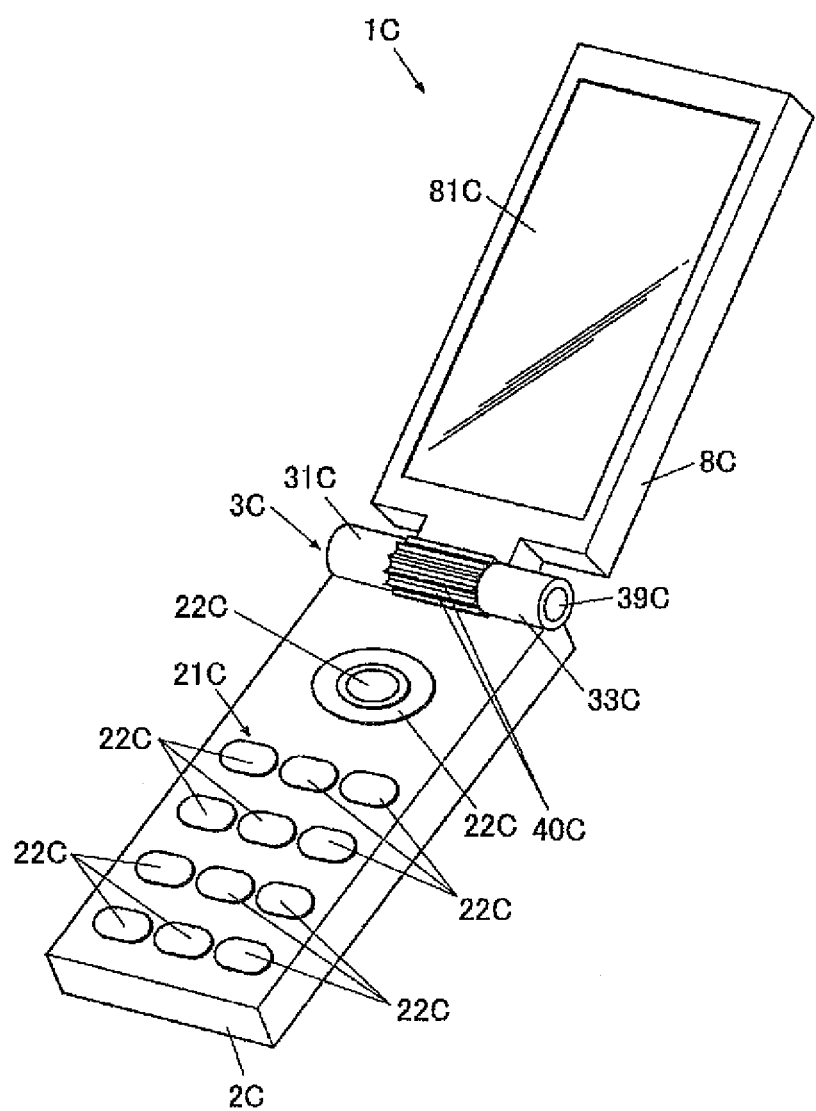
FIG. 10 is a perspective view showing an electronic device according to a fourth embodiment of the invention.
Figure 11:
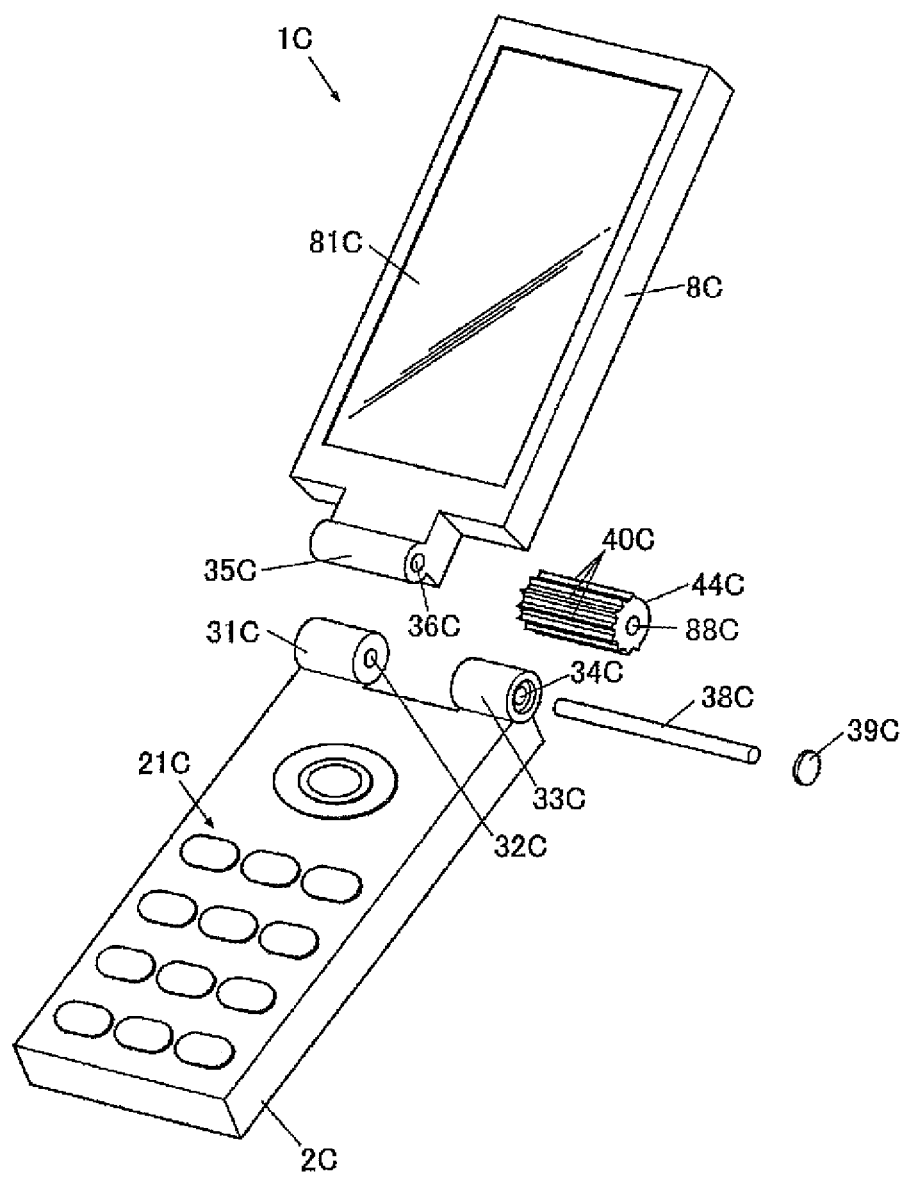
FIG. 11 is an exploded perspective view showing the electronic device according to the fourth embodiment.
Figure 12:
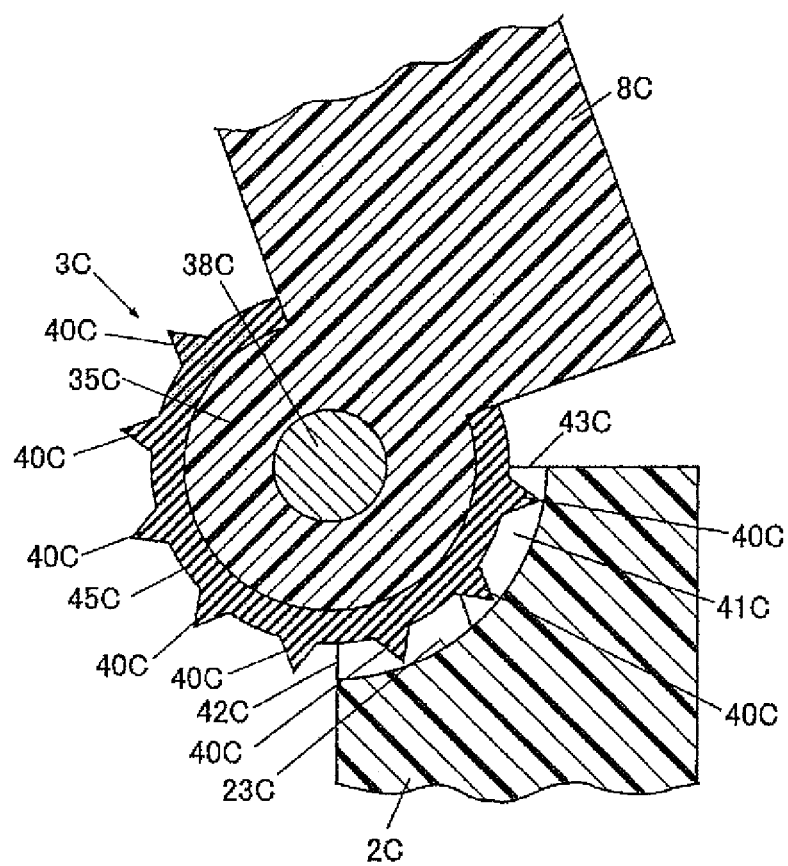
FIG. 12 is a cross-sectional view showing a hinge structure of the electronic device according to the fourth embodiment.

FIG. 10 is a perspective view showing an electronic device 1C. FIG. 11 is an exploded perspective view showing a hinge structure 3C broken-down to a first casing 2C and a second casing 8C set apart from each other. FIG. 12 is a cross-sectional view showing that surface of the hinge structure 3C which is perpendicular to a pivot 38C thereof. Common numerals are given to the individual components of the electronic device 1C according to the fourth embodiment equivalent to those of the electronic device 1B according to the third embodiment with the letter "C" suffixed to the common numerals of the individual components of the electronic device 1C according to the fourth embodiment.

In the electronic device 1C according to the fourth embodiment, a plurality of wiper blades 40C are protrusively provided on a circumferential surface 45C of a hinge rubber 44C. Those wiper blades 40C are arranged in the circumferential direction of the hinge rubber 44C. The individual components of the electronic device 1C according to the fourth embodiment are configured like the corresponding components of the electronic device 1B according to the third embodiment, except that a plurality of wiper blades 40C are provided at the hinge rubber 44C.

Fifth Embodiment

Figure 13:
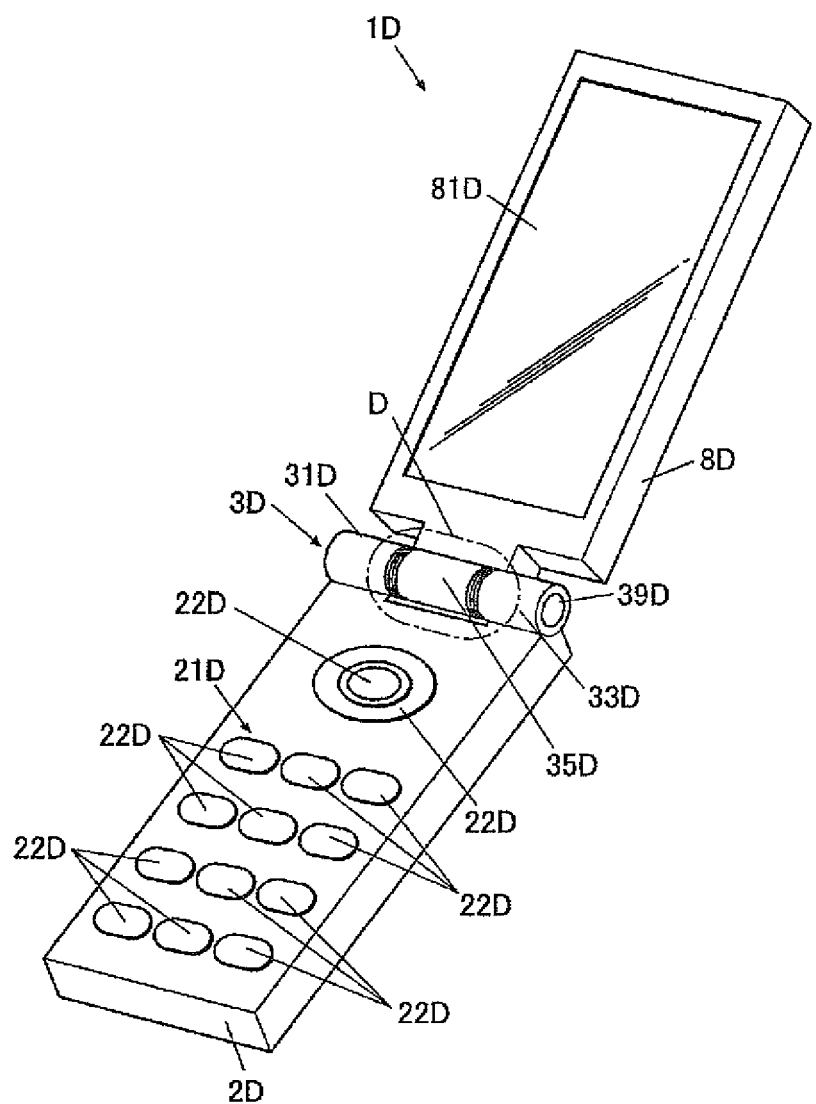
FIG. 13 is a perspective view showing an electronic device according to a fifth embodiment of the invention.
Figure 14:
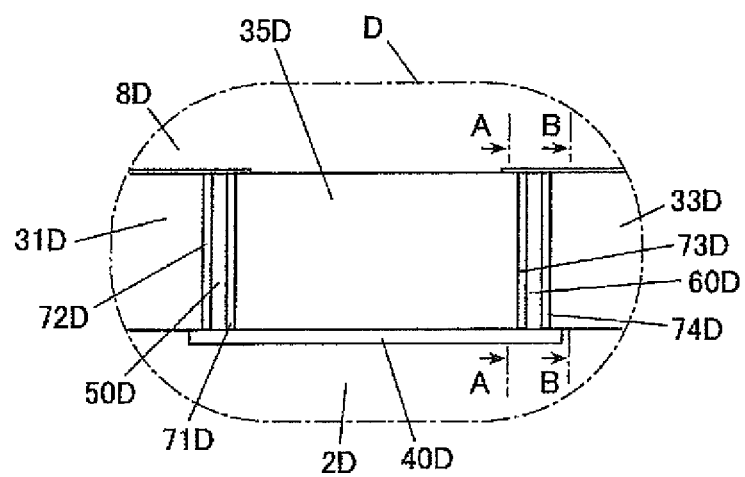
FIG. 14 is a front view showing a region D shown in FIG. 13.
Figure 15:
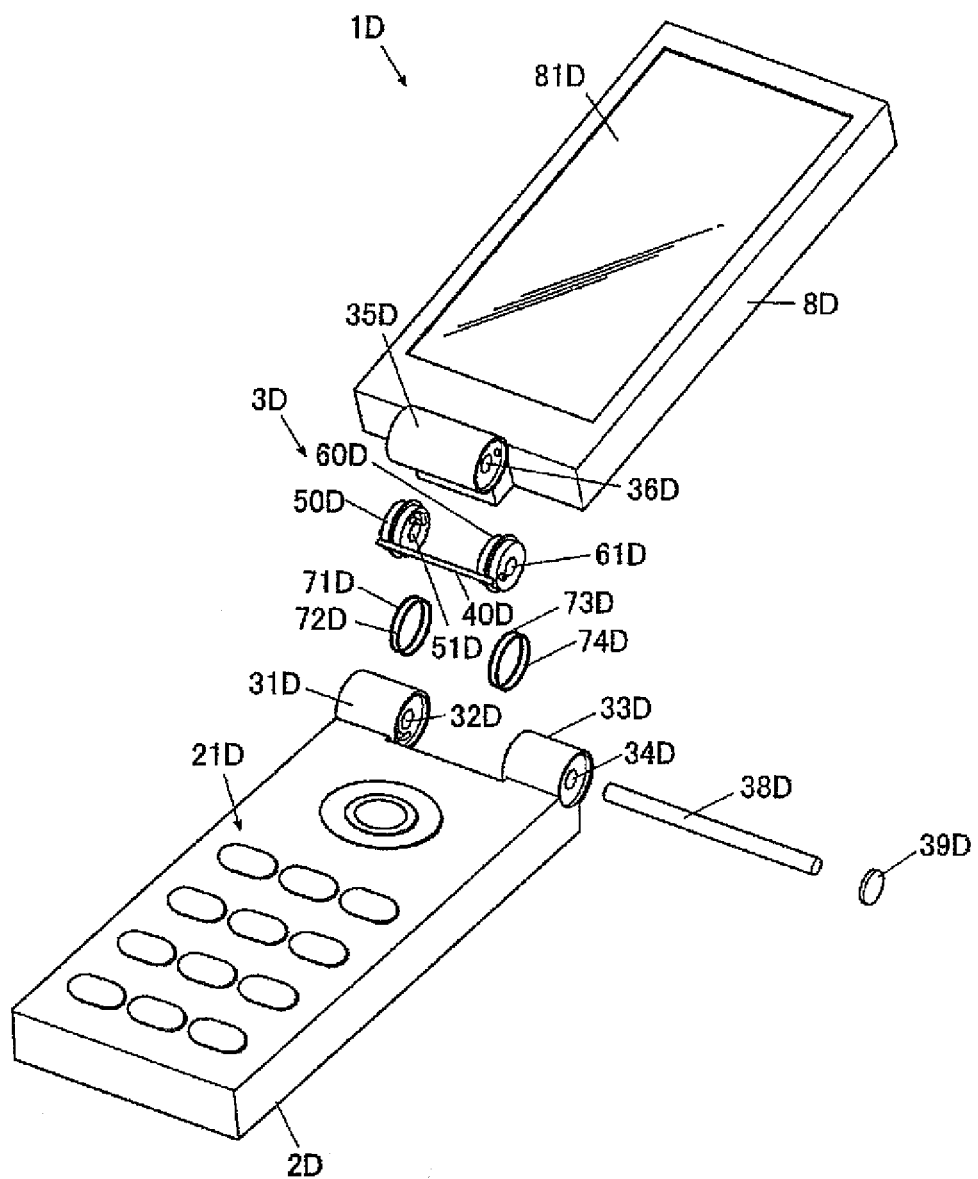
FIG. 15 is an exploded perspective view showing the electronic device according to the fifth embodiment.
Figure 18:
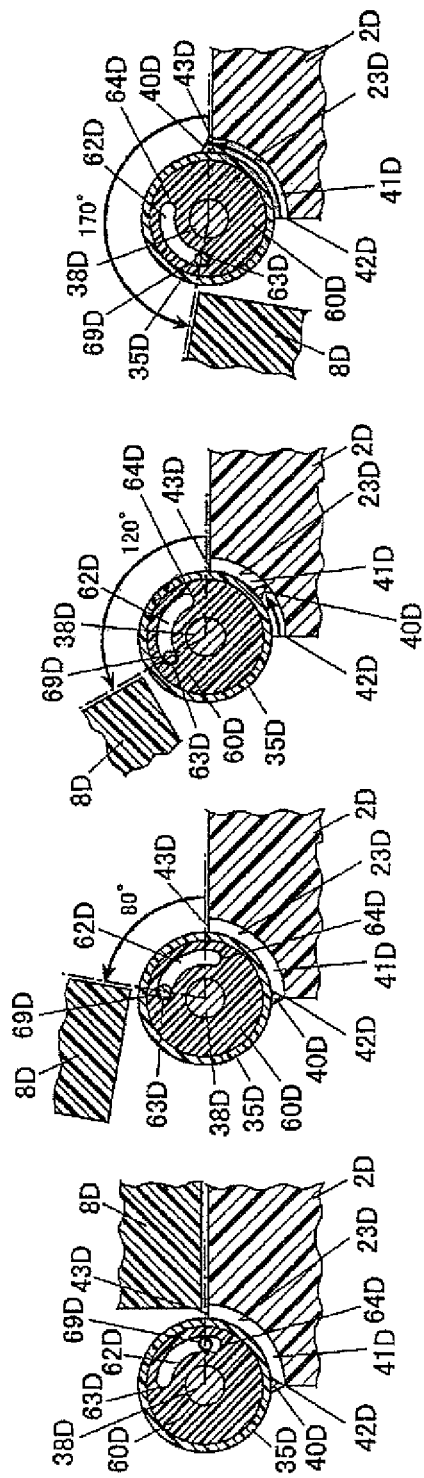
FIGS. 18A to 18D are cross-sectional views showing movement of the hinge structure of the electronic device according to the fifth embodiment.
Figure 19:
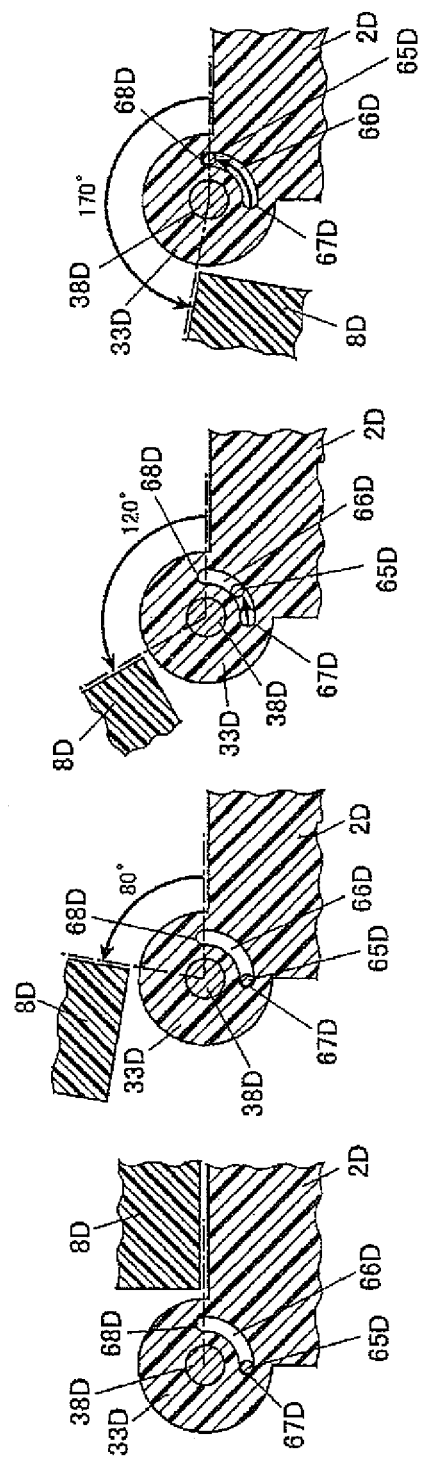
FIGS. 19A to 19D are cross-sectional views showing movement of the hinge structure of the electronic device according to the fifth embodiment.
Figure 20:
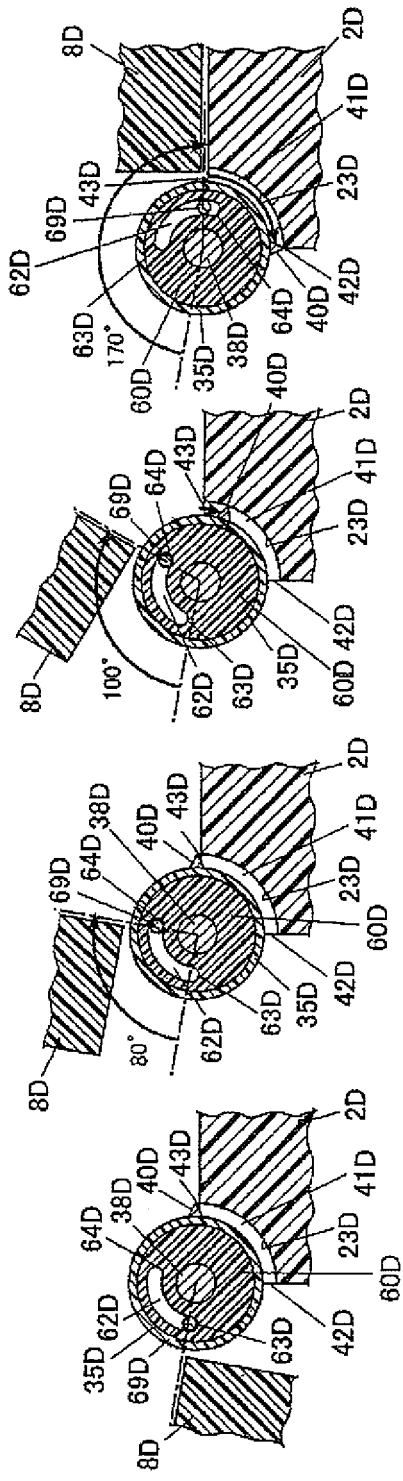
FIGS. 20A to 20D are cross-sectional views showing movement of the hinge structure of the electronic device according to the filth embodiment.
Figure 21:
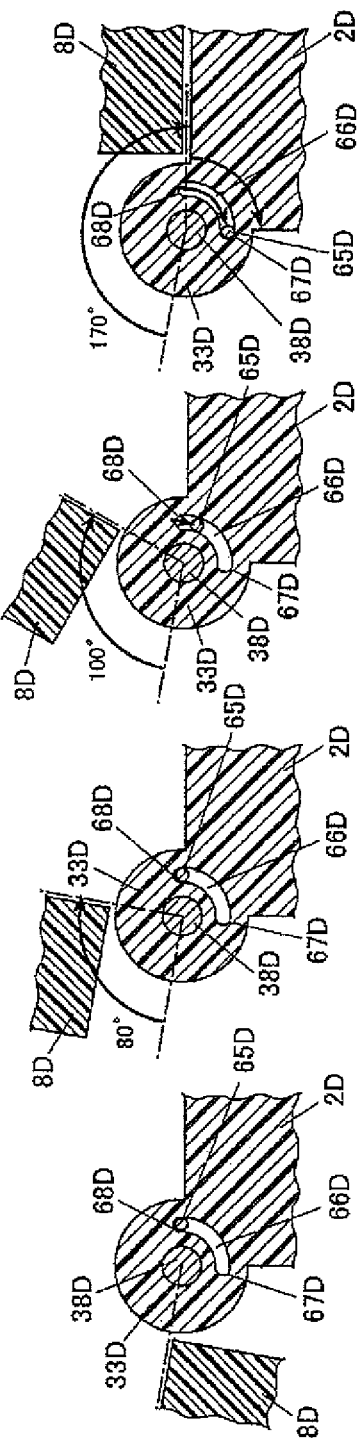
FIGS. 21A to 21D are cross-sectional views showing movement of the hinge structure of the electronic device according to the fifth embodiment.

FIG. 13 is a perspective view showing an electronic device 1D. FIG. 14 is an enlarged front view showing a region D shown in FIG. 13, and FIG. 15 is an exploded perspective view showing a hinge structure 3D broken-down to a first casing 2D and a second casing 8D set apart from each other. Common numerals are given to the individual components of the electronic device 1D according to the fifth embodiment equivalent to those of the electronic device 1 according to the first embodiment with the letter "D" suffixed to the common numerals of the individual components of the electronic device 1D according to the fifth embodiment.

The electronic device 1D according to the fifth embodiment is identical to the electronic device 1 according to the first embodiment in that the operational units 21, 21D are provided on the front side of the first casings 2, 2D, respectively, and the display units 81, 81D are provided on the front side of the second casings 8, 8D, respectively. As the hinge structure 3D of the electronic device 1D differs from the hinge structure 3 of the electronic device 1, the hinge structure 3D will be elaborated below.

The hinge structure 3D includes two first rotational members 31D, 33D provided at the first casing 2D, a second rotational member 35D provided at the second casing 8D, a third rotational member 50D intervening between the first rotational member 31D and the second rotational member 35D, a third rotational member 60D intervening between the first rotational member 33D and the second rotational member 35D, a pivot 38D put through those rotational members 311D, 33D, 35D, 50D and 60D, a wiper blade 40D bridged between the third rotational members 50D, 60D, a cover 39D which closes an shaft hole 34D of the first rotational member 33D from the side, ring-shaped rubbers 71D, 72D wound around the third rotational member 50D, and ring-shaped rubbers 73D, 74D wound around the third rotational member 60D.

One of the first rotational members, 31D, is provided at the upper end portion of the first casing 2D on the left-hand side, while the other first rotational member 33D is provided at the upper end portion of the first casing 2D on the right-hand side. Shaft holes 32D, 34D are respectively formed in the first rotational members 31D, 33D. A recessed cylindrical surface 23D (shown in FIGS. 18A to 18D and FIGS. 20A to 20D) is formed at the upper end portion of the first casing 2D between the first rotational members 31D, 33D.

The second rotational member 35D is provided at the lower end portion of the second casing 8D in the center portion in the horizontal direction. A shaft hole 36D is formed in the second rotational member 35D in parallel to the width direction of the second casing 8D. A circumferential surface 37D of the second rotational member 35D is a cylindrical surface with the center line of the shaft hole 36D being the center.

Shaft holes 51D, 61D are respectively formed in the third rotational members 50D, 60D, and are concentric to each other.

The pivot 38D is put through the shaft hole 34D from the right side of the first rotational member 33D, and is then put through the shaft hole 61D of the third rotational member 60D, the shaft hole 36D of the second rotational member 35D, the shaft hole 51D of the third rotational member 50D and the shaft hole 32D of the first rotational member 31D in order. Those rotational members 31D, 33D, 35D, 50D and 60D are pivotally supported by the pivot 38D.

The third rotational members 50D, 60D are coupled to the first rotational members 31D, 33D by the pivot 38D in such a way as to be rotatable relative to the first rotational members 31D, 33D. The third rotational members 50D, 60D are coupled to the second rotational member 35D by the pivot 38D in such a way as to be rotatable relative to the second rotational member 35D. Accordingly, the third rotational members 50D, 60D are coupling members which are movable relative to the first casing 2D along the cylindrical surface 23D (shown in FIGS. 18A to 18D and FIGS. 20A to 20D) which is a part of the top surface of the first casing 2D.

FIGS. 16 and 17 are exploded perspective views showing the essential portions of the hinge structure 3D.

As shown in FIGS. 16 and 17, an arcuate first groove 56D with the center line of the shaft hole 32D being the center is formed at a right side surface of the first rotational member 31D (surface on the third rotational member 50D side). A first pin 55D is protrusively provided on the left side surface of the third rotational member 50D (surface on the first rotational member 31D side). The distance from the center line of the shaft hole 51D to the pin 55D is set equal to the diameter of the groove 56D with the shaft hole 32D being the center, and the pin 55D is inserted in the groove 56D. As the third rotational member 50D is rotatable relative to the first rotational member 31D, the pin 55D is movable along the groove 56D. Both end portions 57D, 58D of the groove 56D serve as stoppers, so that the rotatable range of the third rotational member 50D with respect to the first rotational member 31D is restricted to a range from the position where the pin 55D abuts on one end portion 57D of the groove 56D to the position where the pin 55D abuts on the other end portion 58D of the groove 56D.

Note that the pin 55D may be formed on the right side surface of the first rotational member 31D, and the groove 56D may be formed on the left side surface of the third rotational member 50D.

With regard to the first rotational member 33D and the third rotational member 60D, an arcuate groove 66D is formed in the first rotational member 33D, and a pin 65D is protrusively provided on the third rotational member 60D, and is inserted in the groove 66D. Accordingly, the rotatable range of the third rotational member 60D with respect to the first rotational member 33D is restricted to a range from the position where the pin 65D abuts on one end portion 67D of the groove 66D to the position where the pin 65D abuts on the other end portion 68D of the groove 66D.

An arcuate second groove 52D with the center line of the shaft hole 51D being the center is formed at a right side surface of the third rotational member 50D (surface on the second rotational member 35D side). A second pin 59D is protrusively provided on the left side surface of the second rotational member 35D (surface on the third rotational member 50D side). The distance from the center line of the shaft hole 36D to the pin 59D is set equal to the diameter of the groove 52D with the shaft hole 51D being the center, and the pin 59D is inserted in the groove 52D. As the third rotational member 50D is rotatable relative to the second rotational member 35D, the pin 59D is movable along the groove 52D. Both end portions 53D, 54D of the groove 52D serve as stoppers, so that the rotatable range of the third rotational member 50D with respect to the second rotational member 35D is restricted to a range from the position where the pin 59D abuts on one end portion 53D of the groove 52D to the position where the pin 59D abuts on the other end portion 54D of the groove 52D. Note that the pin 59D may be formed on the right side surface of the third rotational member 50D, and the groove 52D may be formed on the left side surface of the second rotational member 35D.

With regard to the second rotational member 35D and the third rotational member 60D, an arcuate groove 62D is formed in the third rotational member 60D, and a pin 69D is protrusively provided on the second rotational member 35D, and is inserted in the groove 62D. Accordingly, the rotatable range of the third rotational member 60D with respect to the second rotational member 35D is restricted to a range from the position where the pin 69D abuts on one end portion 63D of the groove 62D to the position where the pin 69D abuts on the other end portion 64D of the groove 62D.

The wiper blade 40D is formed integral with the third rotational members 50D, 60D. The wiper blade 40D abuts on the circumferential surface 37D of the second rotational member 35D in parallel to the shaft hole 36D of the second rotational member 35D. The wiper blade 40D may be a rubber elastic member or a brush.

As shown in FIG. 15, a rubber 71D fills the clearance between the second rotational member 35D and the third rotational member 50D, a rubber 72D fills the clearance between the first rotational member 31D and the third rotational member 50D, a rubber 73D fills the clearance between the second rotational member 35D and the third rotational member 60D, and a rubber 74D fills the clearance between the first rotational member 33D and the third rotational member 60D.

Referring to FIGS. 18A to 21D, the movements of the hinge structure 3D and the electronic device 1D will be described.

FIGS. 18A to 18D and FIGS. 20A to 20D are cross-sectional views taken along the line A-A shown in FIG. 14 as seen from the arrowhead direction, and FIGS. 19A to 19D and FIGS. 21A to 21D are cross-sectional views taken along the line B-B shown in FIG. 14 as seen from the arrowhead direction. FIGS. 18A to 18D and FIGS. 19A to 19D show the operation of opening the first casing 2D and the second casing 8D in order. FIGS. 20A to 20D and FIGS. 21A to 21D show the operation of opening the first casing 2D and the second casing 8D in order.

As shown in FIGS. 18A and 18A, with the first casing 2D and the second casing 8D being closed, the pin 69D is positioned on the end portion 64D side of the groove 62D, the pin 65D abuts on the end portion 67D of the groove 66D, and the wiper blade 40D is positioned at one opening 42D of the clearance 41D to close the opening 42D. Though not illustrated, the pin 59D is positioned on the end portion 54D side of the groove 52D, and the pin 55D abuts on the end portion 57D of the groove 56D.

When the user opens the first casing 2D and the second casing 8D, the second rotational member 35D rotates with respect to the third rotational members 50D, 60D, causing the pins 59D, 69D to move toward the end portion 63D side from the end portion 64D side of the groove 62D. As the third rotational members 50D, 60D do not rotate with respect to the first rotational members 31D, 33D at this time, the pins 55D, 65D are not moved away from the end portion 57D, 67D of the grooves 56D, 66D. This keeps one opening 42D of the clearance 41D closed with the wiper blade 40D.

When the user opens the second casing 8D by 80 degrees with respect to the first casing 2D with the states in FIG. 18A and FIG. 19A being reference states, the pins 59D, 69D abut on the other end portions 53D, 63D of the grooves 52D, 62D (see FIGS. 18B and 19B). When the user further opens the second casing 8D with respect to the first casing 2D, therefore, the third rotational members 50D, 60D are pushed by the pins 59D, 69D and rotated together with the second rotational member 35D (see FIGS. 18C and 19C). At this time, the third rotational members 50D, 60D rotate with respect to the first rotational members 31D, 33D, so that the pins 55D, 65D are moved away from one end portions 57D, 67D of the grooves 56D, 66D toward the other end portions 58D, 68D, and the wiper blade 40D is moved in the clearance 41D from one opening 42D toward the other opening 43D. In this manner, even if a foreign matter enters the clearance 41D formed between the first casing 2D and the second rotational member 35D, the foreign matter can be wiped out with the wiper blade 40D.

When the user opens the second casing 8D by 170 degrees with respect to the first casing 2D with the states in FIG. 18A and FIG. 19A being reference states, the pins 55D, 65D abut on the other end portions 58D, 68D of the grooves 56D, 66D (see FIGS. 18D, 19D, 20A and 21A), so that the third rotational members 50D, 60D do not further rotate with respect to the first rotational members 31D, 33D and the first casing 2D. Further, because the pins 59D, 69D are in abutment with the end portions 53D, 63D of the grooves 52D, 62D, the second casing 8D does not further rotate in the opening direction with respect to the third rotational members 50D, 60D. Therefore, the first casing 2D and the second casing 8D do not open by more than 170 degrees. In this state, the wiper blade 40D is positioned at the other opening 43D of the clearance 41D to close the opening 43D.

When the user closes the first casing 2D and the second casing 8D from the states in FIGS. 20A and 21A, the second rotational member 35D rotates with respect to the third rotational members 50D, 60D, so that the pins 59D, 69D move from the end portion 63D side of the groove 62D toward the end portion 64D side. Because the third rotational members 50D, 60D do not rotate with respect to the first rotational members 31D, 33D at this time, the pins 55D, 65D are not moved away from the end portions 58D, 68D of the grooves 56D, 66D. This keeps the opening 43D of the clearance 41D closed with the wiper blade 40D.

When the user closes the second casing 8D by 80 degrees with respect to the first casing 2D with the states in FIGS. 20A and 21A being reference states, the pins 59D, 69D abut on the other end portions 54D, 64D of the grooves 52D, 62D (see FIGS. 20B and 21B). When the user further closes the second casing 8D with respect to the first casing 2D, therefore, the third rotational members 50D, 60D are pushed by the pins 59D, 69D and rotated together with the second rotational member 35D (see FIGS. 20C and 21C). As the third rotational members 50D, 60D rotate with respect to the first rotational members 31D, 33D at this time, the pins 55D, 65D are moved away from the end portions 58D, 68D of the grooves 56D, 66D toward the opposite end portions 57D, 67D, and the wiper blade 40D is moved in the clearance 41D from the opening 43D toward the other opening 42D. As apparent from the above, even if a foreign matter enters the clearance 41D formed between the first casing 2D and the second rotational member 35D, the foreign matter can be wiped out with the wiper blade 40D.

When the user closes the second casing 8D by 170 degrees with respect to the first casing 2D with the states in FIGS. 20A and 21A being reference states, the front side of the first casing 2D faces the front side of the second casing 8D, thus inhibiting the further rotations of the first casing 2D and the second casing 8D (see FIGS. 20D, 21D, 18A and 19A). In this state, the pins 55D, 65D abut on the end portions 57D, 67D of the grooves 56D, 66D, so that the third rotational members 50D, 60D do not further rotate with respect to the first rotational members 31D, 33D and the first casing 2D. In this state, the wiper blade 40D is positioned at the opening 42D of the clearance 41D to close the opening 42D.

With the first casing 2D and the second casing 8D being closed (FIGS. 18A, 19A, 20D and 21D), as apparent from the above, the front side opening 43D of the clearance 41D is covered with the first casing 2D, and the upper opening 42D of the clearance 41D is closed with the wiper blade 40D, making it difficult for a foreign matter to enter the clearance 41D. With the first casing 2D and the second casing 8D being open (FIGS. 18D, 19D, 20A and 21A), on the other hand, the front side opening 43D of the clearance 41D is closed with the wiper blade 40D, making it difficult for a foreign matter to enter the clearance 41D.

The angle from the opening 42D of the clearance 41D to the opening 43D thereof about the pivot 38D is narrower than the angle by which the second casing 8D is rotatable with respect to the first casing 2D. With the angle set that way, the third rotational member 50D, 60D intervenes between the first rotational member 3D, 33D and the second rotational member 35D, so that the third rotational members 50D, 60D are rotatable with respect to the first rotational member 31D, 33D as well as the second rotational member 35D. The range where the third rotational members 50D, 60D are rotatable with respect to the first rotational members 31D, 33D is defined by the grooves 56D, 66D, and the range where the third rotational members 50D, 60D is rotatable with respect to the second rotational member 35D is defined by the grooves 52D, 62D. The rotatable ranges of the third rotational members 50D, 60D and the wiper blade 40D can be set by the grooves 52D, 62D, 56D and 66D to an angle ranging from the opening 42D of the clearance 41D to the opening 43D thereof about the pivot 38D.

Sixth Embodiment

Figure 22:
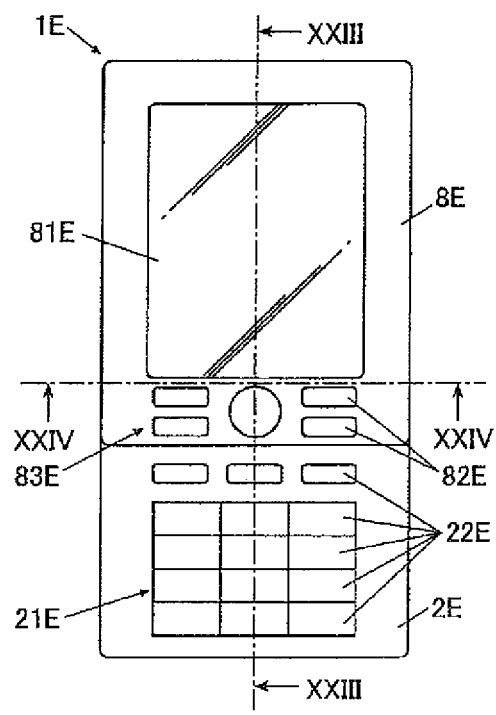
FIG. 22 is a front view showing an electronic device according to a sixth embodiment of the invention.
Figure 23:
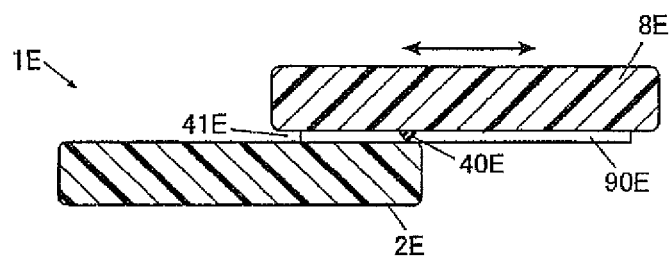
FIG. 23 is a cross-sectional view taken along the line XXIII-XXIII in FIG. 22 as seen from the arrowhead direction.
Figure 24:
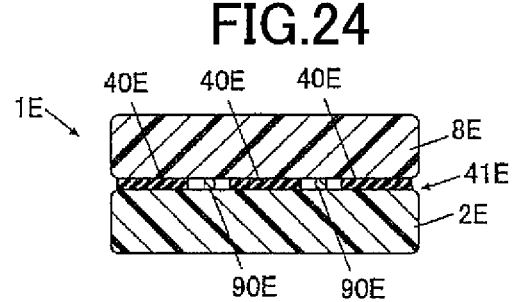
FIG. 24 is a cross-sectional view taken along the line XXIV-XXIV in FIG. 22 as seen from the arrowhead direction.

FIG. 22 is a front view showing an electronic device 1E according to the sixth embodiment of the invention, FIG. 23 is a cross-sectional view taken along the line XXIII-XXIII in FIG. 22 as seen from the arrowhead direction, and FIG. 24 is a cross-sectional view taken along the line XXIV-XXIV in FIG. 22 as seen from the arrowhead direction.

An operational unit 21E is provided at the front lower portion of a first casing 2E. The operational unit 21E has a plurality of key tops 22E, and push switches or the like corresponding to the individual key tops 22E. The rear side of a second casing 8E is coupled to the front side of the first casing 2E by a slide mechanism 90E. The second casing 8E is a coupling member movable relative to the first casing 2E. That is, the slide mechanism 90E allows the second casing 8E to be slidable up and down and linearly relative to the first casing 2E. The slidable range of the second casing 8E is determined by the slide mechanism 90E, ranging from the position where the entire first casing 2E and the entire second casing 8E overlie each other to the position where the second casing 8E is shifted upward with respect to the first casing 2E so that the lower portion of the second casing 8E becomes overlying the upper portion of the first casing 2E. The operational unit 21E is exposed with the second casing 8E being shifted upward with respect to the first casing 2E, while the operational unit 21E is hid by the second casing 8E with the second casing 8E overlying the first casing 2E.

A display unit 81E having a liquid crystal display panel or an organic EL display panel is provided at the front side of the second casing 8E. Further, an operational unit 83E having a plurality of key tops 82E or the like is provided on the front side of the second casing 8E under the display unit 81E.

A clearance 41E is formed between the front side of the first casing 2E and the rear side of the second casing 8E. A plurality of wiper blades 40E are provided at a vertical intermediate portion of the rear side of the second casing 8E. The wiper blades 40E are projections extending in a direction perpendicular to the slide direction of the second casing 8E. The wiper blades 40E are arranged in line in a direction perpendicular to the slide direction of the second casing 8E. The wiper blades 40E are made of rubber elastic material or brush, and have flexibility. The wiper blades 40E may be projections formed integral with the second casing 8E and protruding from the rear side of the second casing 8E.

The height of the wiper blades 40E from the rear side of the second casing 8E as a reference position is equal to the width of the clearance 41E, so that the top portions of the wiper blades 40E abut on the front side of the first casing 2E. The top portions of the wiper blades 40E may be set apart slightly from the front side of the first casing 2E.

When the user slides the second casing 8E upward with respect to the first casing 2E, the wiper blades 40E move upward together with the second casing 8E. Therefore, a foreign matter having entered the clearance 41E is wiped out to the upper opening from the clearance 41E. When the second casing 8E comes to the topmost end in the slidable range, the wiper blades 40E are positioned to the upper opening of the clearance 41E to close the upper opening. When the user slides the second casing 8E downward with respect to the first casing 2E, on the other hand, the wiper blades 40E slide downward together with the second casing 8E.

Seventh Embodiment

FIGS. 25A to 25D and FIGS. 26A to 26D are rear views showing an electronic device 1F according to the seventh embodiment. FIGS. 25A to 25D show the process in which a display unit casing 8F turns from a vertical elongated state to a horizontal elongated state. FIG. 25A shows the vertical elongated state, FIG. 25D shows the horizontal elongated state, FIGS. 25B and 25C show states between the vertical elongated state and the horizontal elongated state. FIGS. 26A to 26D show the process in which a display unit casing 8F turns from a horizontal elongated state to a vertical elongated state. FIG. 26A shows the horizontal elongated state, FIG. 26D shows the vertical elongated state, and FIGS. 26B and 26C show states between the horizontal elongated state and the vertical elongated state.

A coupling member 100F is coupled to the upper end portion of a main body casing 2F via a hinge section 3F, and the rotations of the main body casing 2F and the coupling member 100F by the hinge section 3F set the main body casing 2F and the coupling member 100F in a closed state with the front side of the main body casing 2F facing the front side of the coupling member 100F, and set the main body casing 2F and the coupling member 100F in an open state with the front sides of the main body casing 2F and the coupling member 100F facing frontward.

An operational unit having a plurality of key tops or the like is provided at the front side of the main body casing 2F, and an electronic camera unit 29F is provided at the rear side of the main body casing 2F.

The rear side of the display unit casing 8F is coupled to the front side of the coupling member 100F via a slide/rotary mechanism, so that the coupling member 100F is movable relative to the display unit casing 8F along the rear side of the display unit casing 8F. Specifically, the display unit casing 8F is provided at the front side of the coupling member 100F in such a way as to be rotatable about a vertical shaft which is slidable up and down at the front side of the coupling member 100F. Therefore, the display unit casing 8F can be reciprocally turned from the vertical elongated state to the horizontal elongated state with respect to the coupling member 100F, so that the display unit casing 8F is symmetrical to the right and left line regardless of the horizontal elongated state or the vertical elongated state of the display unit casing 8F.

A display unit having a liquid crystal display panel or an organic EL display panel is provided at the front side of the display unit casing 8F.

A wiper blade 40F is provided at the front side of the coupling member 100F between the front side of the coupling member 100F and the rear side of the display unit casing 8F. The wiper blade 40F is provided along the left edge, upper edge and right edge of the front side of the coupling member 100F. The wiper blade 40F is made of rubber elastic material or brush, and has flexibility. The wiper blade 40F may be a projection formed integral with the coupling member 100F and protruding from the rear side of the coupling member 100F.

The height of the wiper blade 40F from the front side of the coupling member 100F as a reference position is equal to the width of the clearance between the front side of the coupling member 100F and the rear side of the display unit casing 8F, so that the top portion of the wiper blade 40F abuts on the rear side of the display unit casing 8F. The top portion of the wiper blade 40F may be set apart slightly from the rear side of the display unit casing 8F.

Figure 25:
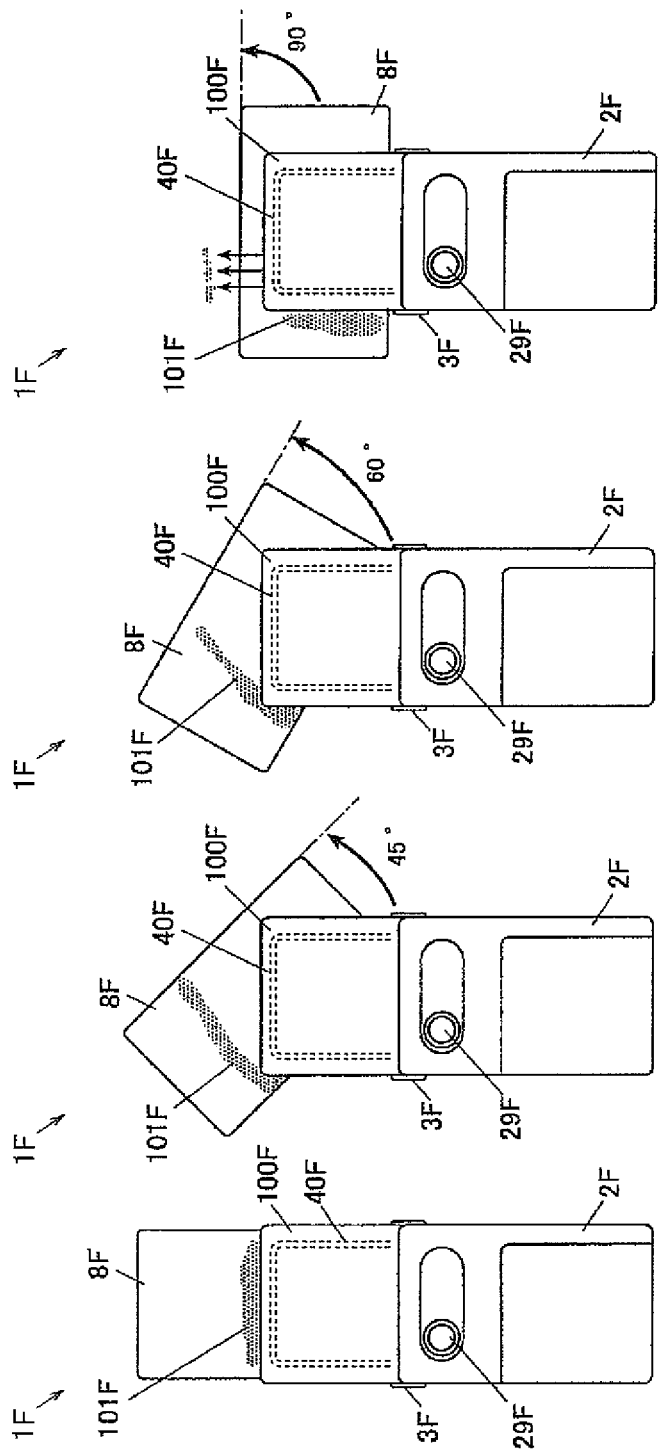
FIGS. 25A to 25D are rear views showing movement of an electronic device according to a seventh embodiment of the invention.
Figure 26:
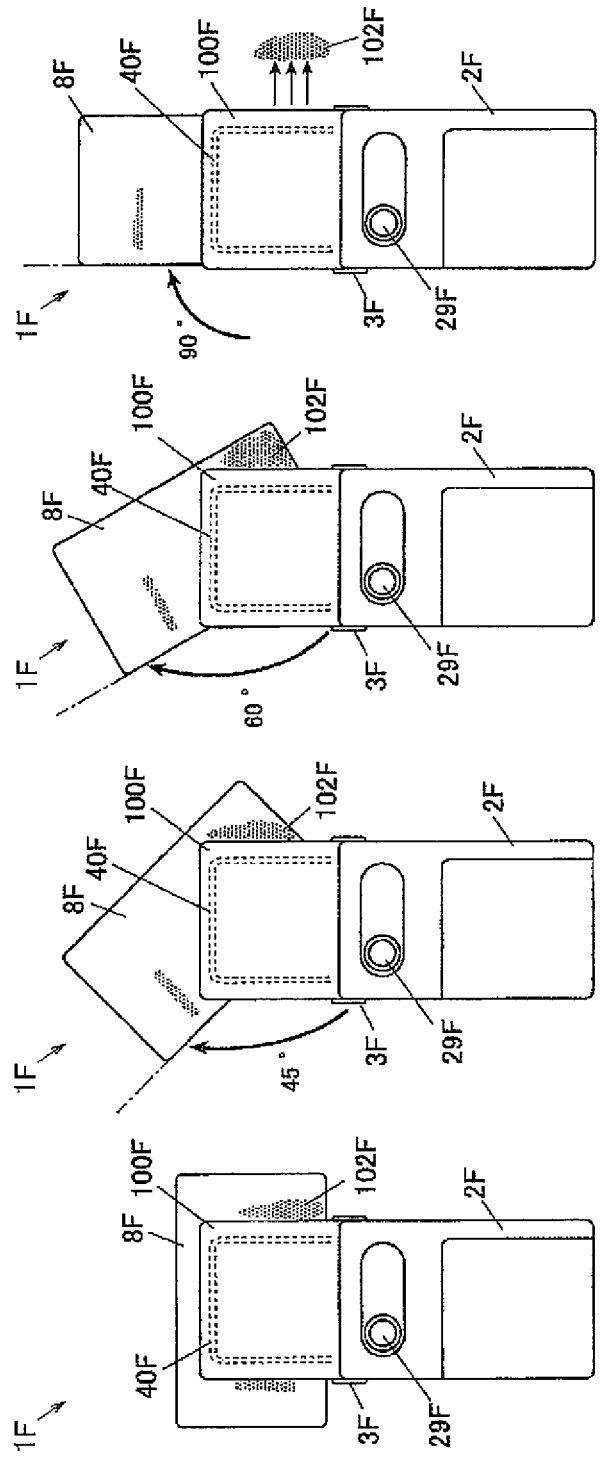
FIGS. 26A to 26D are rear views showing movement of the electronic device according to the seventh embodiment.

As shown in FIG. 25, when the user turns the display unit casing 8F from the vertical elongated state to the horizontal elongated state, a foreign matter 101F having attached on the rear side of the display unit casing 8F is wiped out by the wiper blade 40F. And as shown in FIG. 26, when the user turns the display unit casing 8F from the horizontal elongated state to the vertical elongated state, a foreign matter 102F is wiped out by the wiper blade 40F. Therefore, a foreign matter does not enter the clearance between the display unit casing 8F and the coupling member 100F.

Eighth Embodiment

While a foreign matter is cleaned out with the wiper blade in the first to seventh embodiments, the present invention is not limited to those embodiments of cleaning a foreign matter with a wiper blade. The following will describe an embodiment that removes a foreign matter by injecting air to a clearance.

Figure 27:
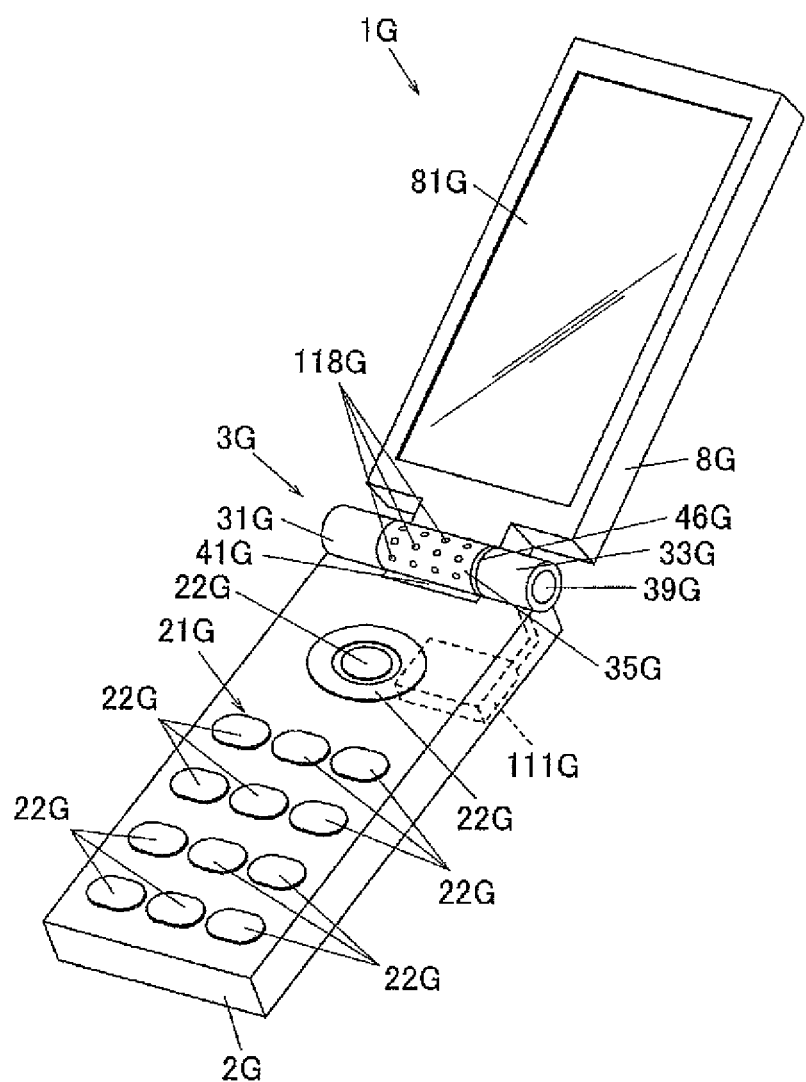
FIG. 27 is a perspective view showing an electronic device according to an eighth embodiment of the invention.
Figure 28:
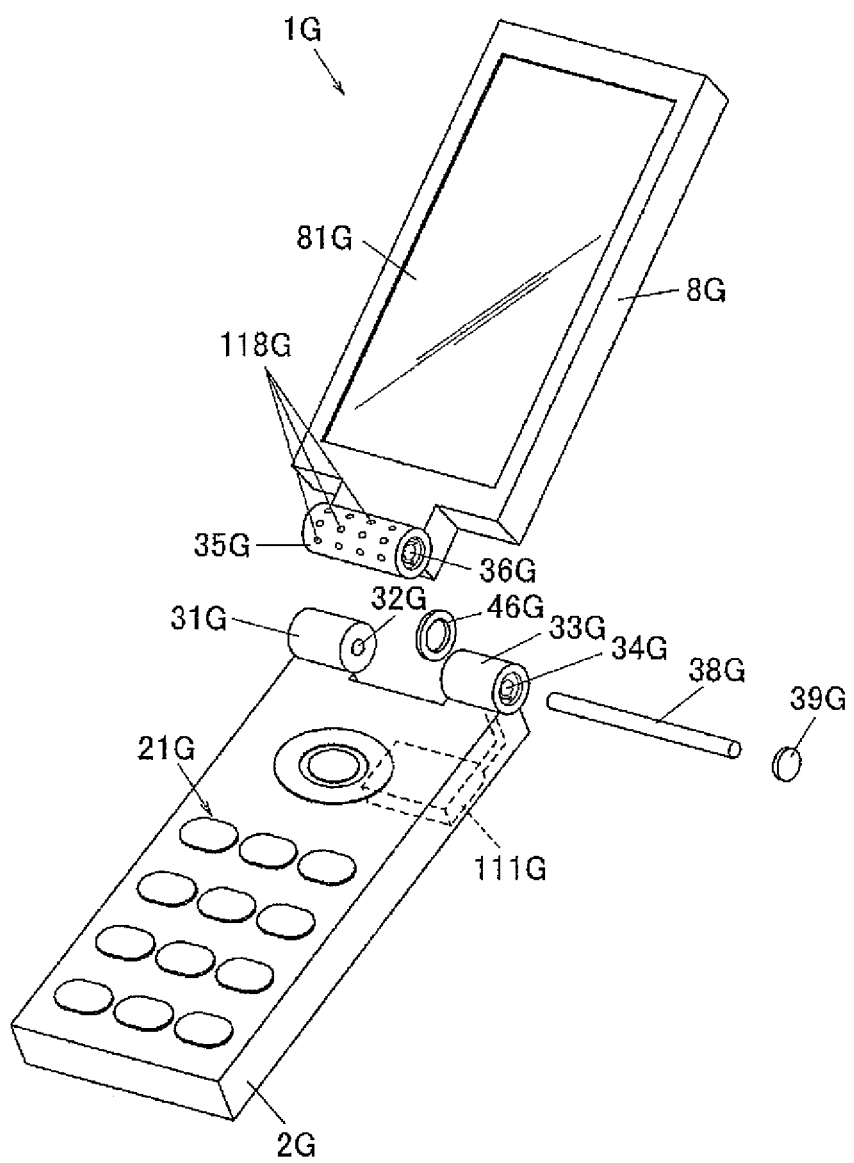
FIG. 28 is an exploded perspective view showing the electronic device according to the eighth embodiment.
Figure 29A:
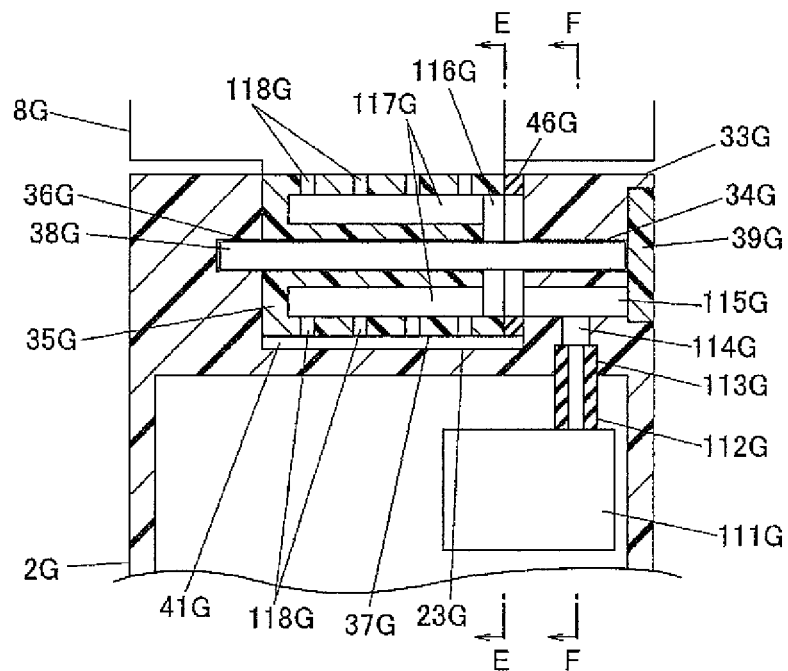
FIG. 29A is a cross-sectional view showing a hinge structure of the electronic device according to the eighth embodiment.
Figure 29B:
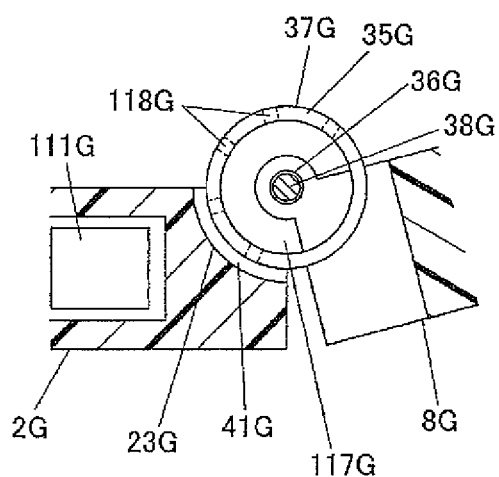
FIG. 29B is a cross-sectional view taken along the line E-E in FIG. 29A.
Figure 29C:
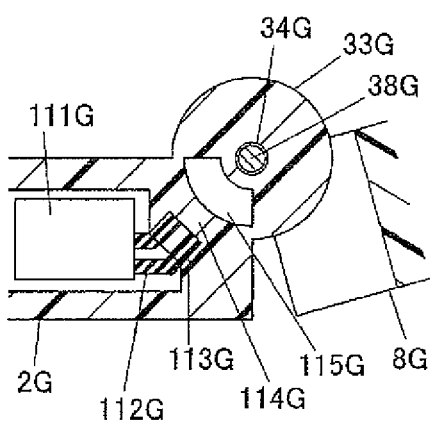
FIG. 29C is a cross-sectional view taken along the line F-F in FIG. 29A.

FIG. 27 is a perspective view showing the configuration of an electronic device 1G according to the eighth embodiment. FIG. 28 is an exploded perspective view of a hinge structure 3G. FIG. 29A is a schematic diagram showing the cross-section of the hinge structure 3G along the center line of a pivot 380, FIG. 29B is a cross-sectional view taken along the line E-E in FIG. 29A as seen from the arrowhead direction, and FIG. 29C is a cross-sectional view taken along the line F-F in FIG. 29A as seen from the arrowhead direction. Common numerals are given to the individual components of the electronic device 1G according to the eighth embodiment equivalent to those of the electronic device 1 according to the first embodiment with the letter "G" suffixed to the common numerals of the individual components of the electronic device 1G according to the eighth embodiment.

The electronic device 1G has a small air compressor 111G mounted to a first casing 2G. The air compressor 111G has a flexible tube 112G at its blow port.

The first casing 2G is provided with a cylindrical joint member 113G and a first passage 114G penetrating the joint member 113G and connected to a first rotational member 33G. The tube 112G is connected to the joint member 113G.

An arcuate second passage 115G with the center line of a shaft hole 34G being the center is formed at a first rotational member 33G outside the shaft hole 34G. The second passage 115G penetrates the first rotational member 33G and is connected to the first passage 114G.

A cylindrical groove 116G with the center line of a shaft hole 36G being the center, a third passage 117G which is an arcuate groove outside the shaft hole 36G with the center line of the shaft hole 36G being the center, and an air injection port 118G penetrating the third passage 117G and a circumferential surface 37G are formed at a second rotational member 35G.

A rubber 46G serves to cancel a clearance between the first rotational member 33G and the second rotational member 35G and to set the passages airtight from outside the electronic device 1G. A cover 39G serves to close the shaft hole 34G and to set the passages airtight from outside the electronic device 1G.

Compressed air from the air compressor 111G is injected to a clearance 41G through the tube 112G, the first passage 114G, the second passage 115G, the cylindrical groove 116G, the third passage 117G, and the air injection port 118G to discharge a penetrated foreign matter.

The injection timing is set in such a way that the opening/closing of the electronic device 1G is detected by an open/close switch (not shown) provided at the first casing 2G and air injection is carried out for a predetermined time under the control of a microcomputer (not shown) incorporated in the first casing 2G.

Ninth Embodiment

Figure 30:
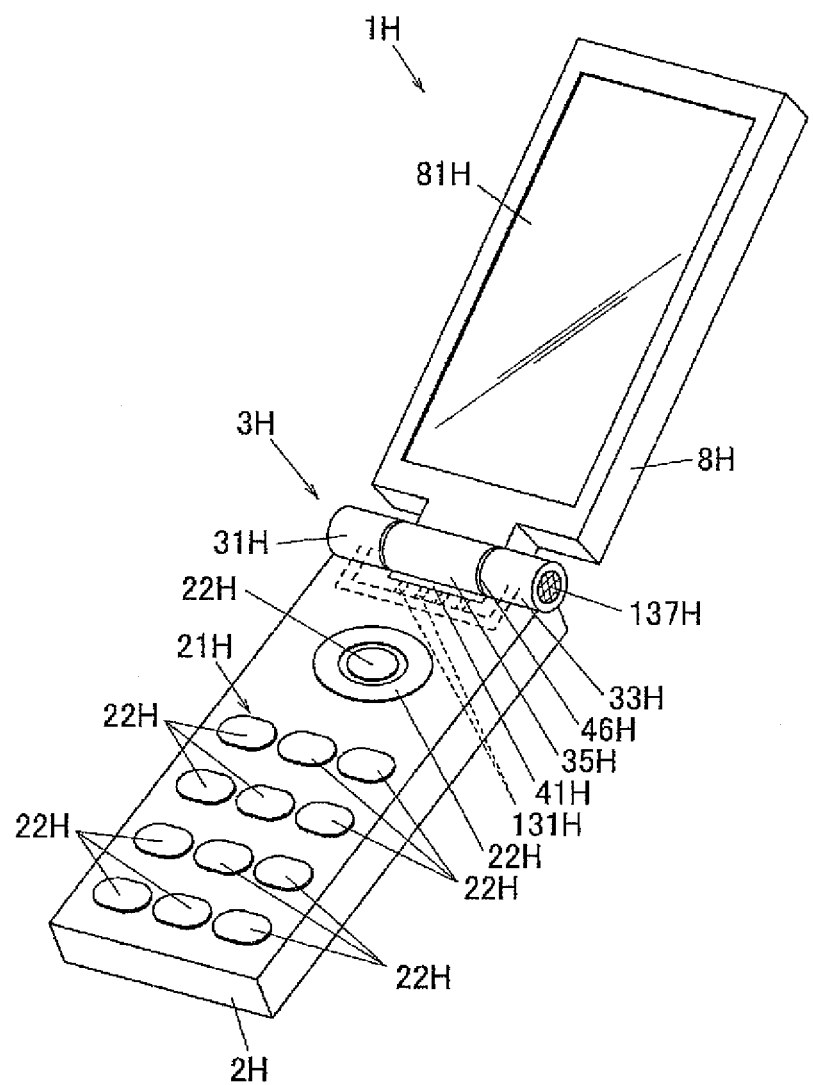
FIG. 30 is a perspective view showing an electronic device according to a ninth embodiment of the invention.
Figure 31:
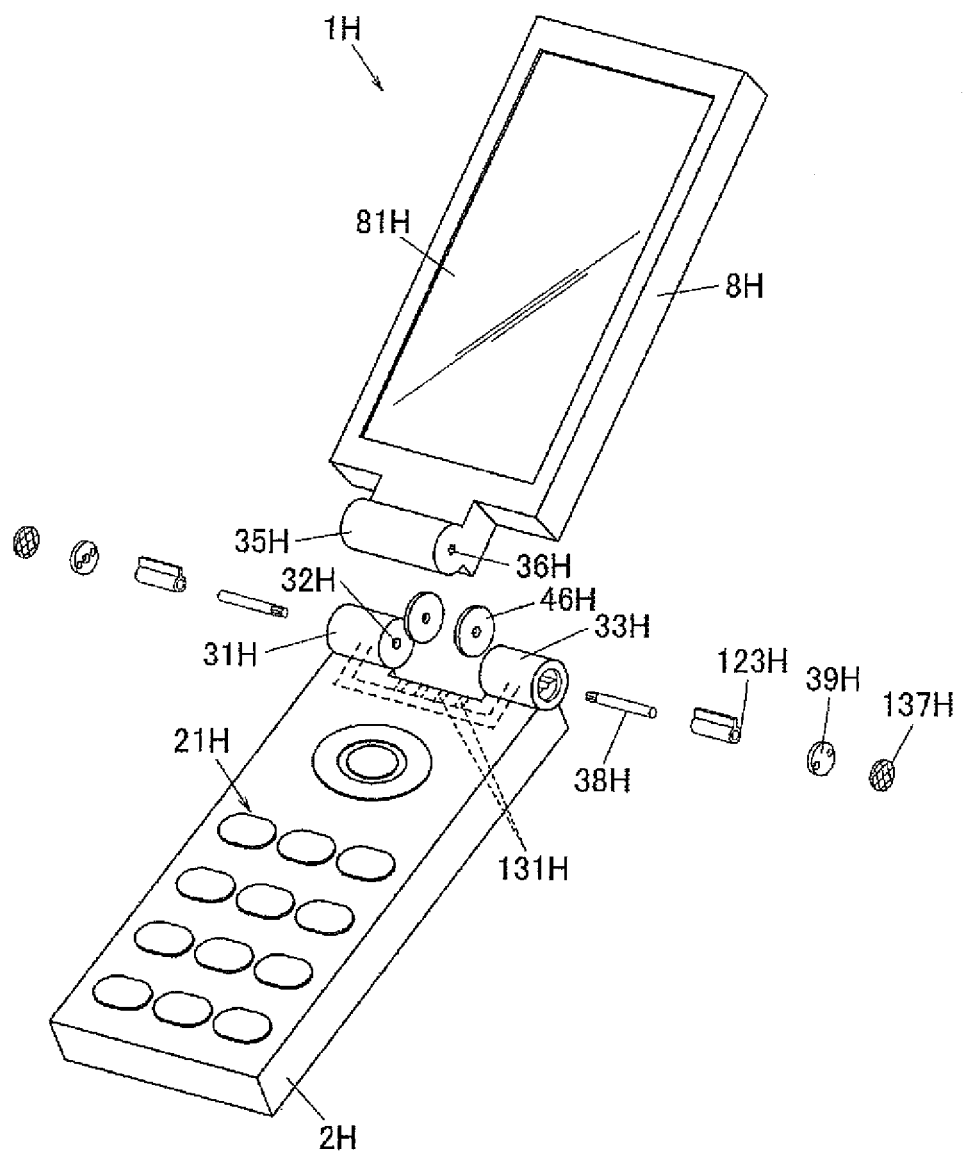
FIG. 31 is an exploded perspective view showing the electronic device according to the ninth embodiment.
Figure 32A:
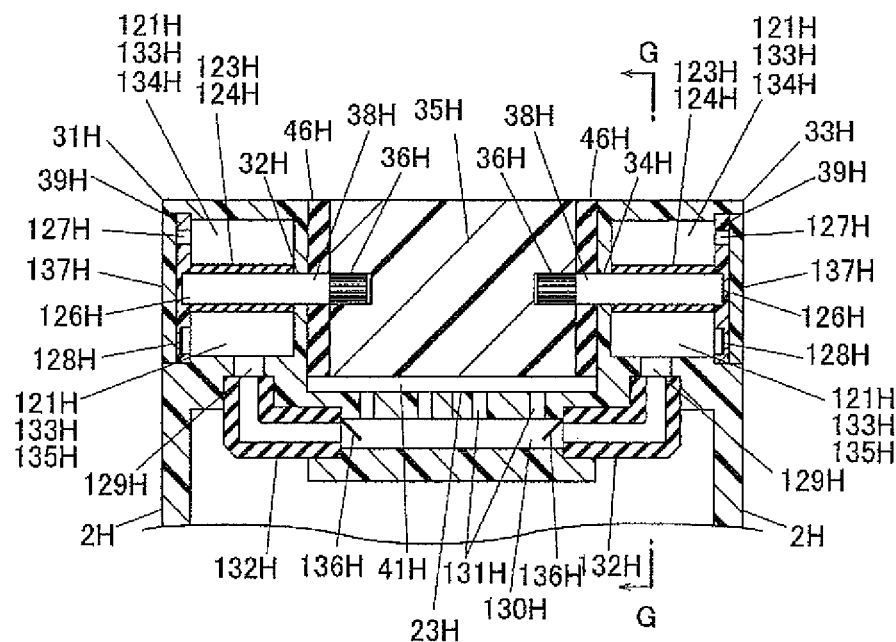
FIG. 32A is a cross-sectional view showing a hinge structure of the electronic device according to the ninth embodiment.
Figure 32B:
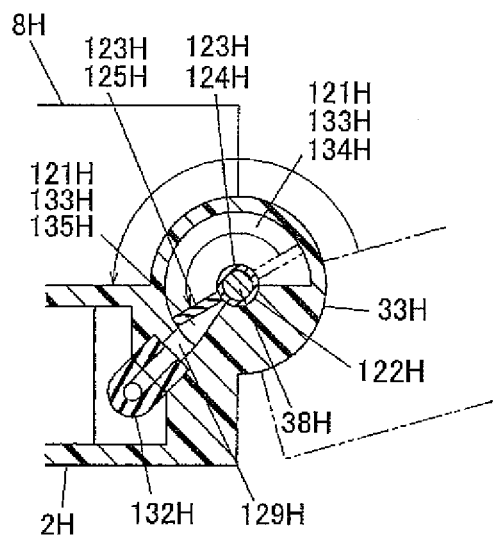
FIG. 32B is a cross-sectional view taken along the line G-G in FIG. 32A.
Figure 33A:
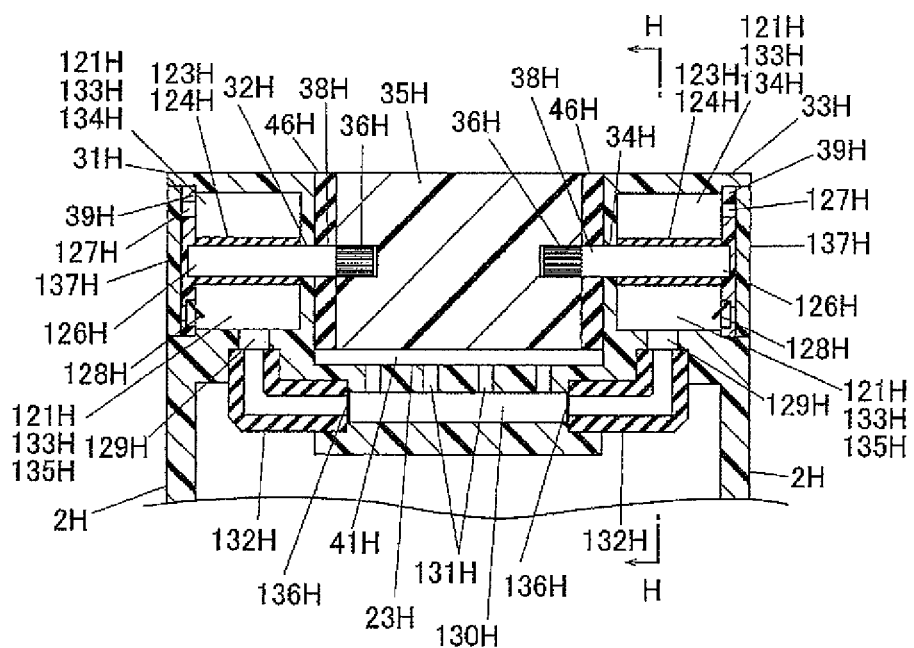
FIG. 33A is a cross-sectional view showing a hinge structure of the electronic device according to the ninth embodiment.
Figure 33B:
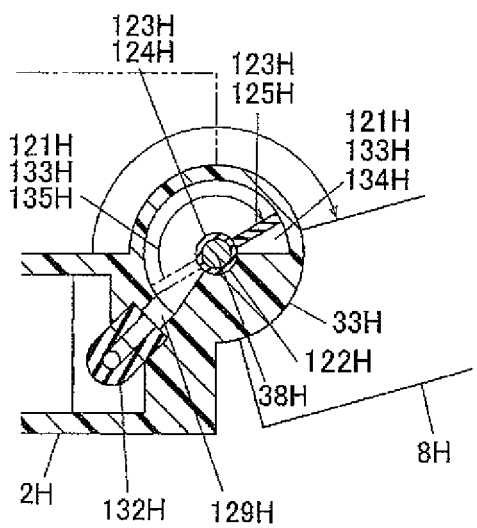
FIG. 33B is a cross-sectional view taken along the line H-H in FIG. 33A.

FIG. 30 is a perspective view showing an electronic device 1H. FIG. 31 is an exploded perspective view of a hinge structure 31H as seen from the arrowhead direction. FIG. 32A is a schematic cross-sectional view taken along a center line of a pivot 38H of the hinge section 3H, and FIG. 32B is a schematic cross-sectional view taken along the line G-G shown in FIG. 32A. FIGS. 32A and 32B show closing motion by a second casing 8H with respect to a first casing 2H. FIG. 33 A is a schematic cross-sectional view taken along a center line of a pivot 38H of the hinge section 3H, and FIG. 33B is a schematic cross-sectional view taken along the line H-H shown in FIG. 33A. FIGS. 33A and 33B show opening motion by a second casing 8H with respect to a first casing 2H. Common numerals are given to the individual components of the electronic device 1H according to the ninth embodiment equivalent to those of the electronic device 1 according to the first embodiment with the letter "H" suffixed to the common numerals of the individual components of the electronic device 1H according to the ninth embodiment.

The electronic device 1H has an air compressing mechanism which operates by rotation of the first casing 2H and the second casing 8H.

A fan-shaped groove 121H and a cylindrical groove 122H are formed along the center line of a shaft hole 34H in a first rotational member 33H.

A spline is formed at one end of the pivot 38H.

A spline corresponding to the pivot 38H is formed at a shaft hole 36H of a second rotational member 35H.

A vane 123H is a rubber molded article having a cylindrical portion 124H and a blade portion 125H provided at the circumferential surface of the cylindrical portion 124H so as to extend along the center line thereof.

A cover 39H is provided with a shaft groove 126H corresponding to the pivot 38H, a vent hole 127H and a check valve 128H.

The first casing 2H is provided with a first passage 129H connected to the fan-shaped groove 121H, a second passage 130H extending along a cylindrical surface 23H, and air injection ports 131H connecting to the cylindrical surface 23H from the second passage 130H. The first passage 129H and the second passage 130H are coupled by a flexible tube 132H to communicate with each other. A check valve 136H is provided to one end of the tube 132H and prevents the counterflow of air from an air injection port 131H.

The pivot 38H is inserted in the cylindrical portion 124H of the vane 123H. The inside diameter of the cylindrical portion 124H is set slightly smaller than the outside diameter of the pivot 38H, so that the vane 123H is coupled to the pivot 38H.

One end of the pivot 38H passes through the shaft hole 34H of the first rotational member 33H to be coupled to the shaft hole 36H of the second rotational member 35H by the spline. The other end of the pivot 38H is pivotally supported by the shaft groove 126H of the cover 39H.

The cylindrical portion 124H of the vane 123H is held by the cylindrical surface of the cylindrical groove 122H of the first rotational member 33H and the pivot 38H, and the blade portion 125H is in contact with the wall surface of fan-shaped space 133H surrounded by the fan-shaped groove 121H and the cover 39H, so that the vane 123H partitions the fan-shaped space 133H into an air chamber 134H and a compression chamber 135H.

At this time, the vent hole 127H is positioned near the circumferential end face of the air chamber 134H, and the check valve 128H is positioned near the circumferential end face of the compression chamber 135H. The check valve 128 enables air suction into the compression chamber 135H and inhibits discharge from the compression chamber 135H.

A filter 137H is provided to the outside of the cover 39H, which prevents entry of a foreign-matter into the fan-shaped space 133H.

As shown in FIGS. 32A and 32B, when the second casing 8H is closed, air is compressed in the compression chamber 135H with the rotation of the vane 123H. The compressed air passes through the first passage 129H, the tube 132H, the second passage 130H and the air injection ports 131H to be injected to the clearance 41H from the cylindrical surface 23H. At this time, the check valve 128H provided to the cover 39H is closed and the check valve 136H provided to the tube 132H is open. In the air chamber 134H, air is sucked from outside the electronic device through the vent hole 127H to thereby cancel the rotational resistance originated from a pressure change.

As shown in FIGS. 33A and 33B, when the second casing 8H is opened, the air is expanded in the compression chamber 135H with the rotation of the vane 123H. At this time, the check valve 136H provided to the tube 132H is closed and the check valve 128H provided to the cover 39 H is opened and air suction is carried out through the check valve 128H, thus preventing the counterflow of air from the air injection ports 131H. In the air chamber 134H, air is discharged outside the electronic device through the vent hole 127H to thereby cancel the rotational resistance originated from a pressure change.

The same mechanism as the air compressing mechanism structured at the first rotational member 33H is also arranged at a first rotational member 31H, so that compressed airs merge at the second passage 130H.

According to the ninth embodiment, a passage communicating with the second rotational member may be formed at the first rotational member(s) 31H and/or 33H, and passages and air injection ports may be formed at the second rotational member 35H.

While air is injected only when the second casing 8H is closed in this embodiment, the air compressing mechanisms independently provided at the first rotational members 31H, 33H may have independent passages and air injection ports provided thereat, so that the first rotational members 31H, 33H carry out air injection at the time of opening and at the time of closing, respectively.

Tenth Embodiment

This embodiment has a hinge cover which is elastically displaced within a clearance.

Figure 34:
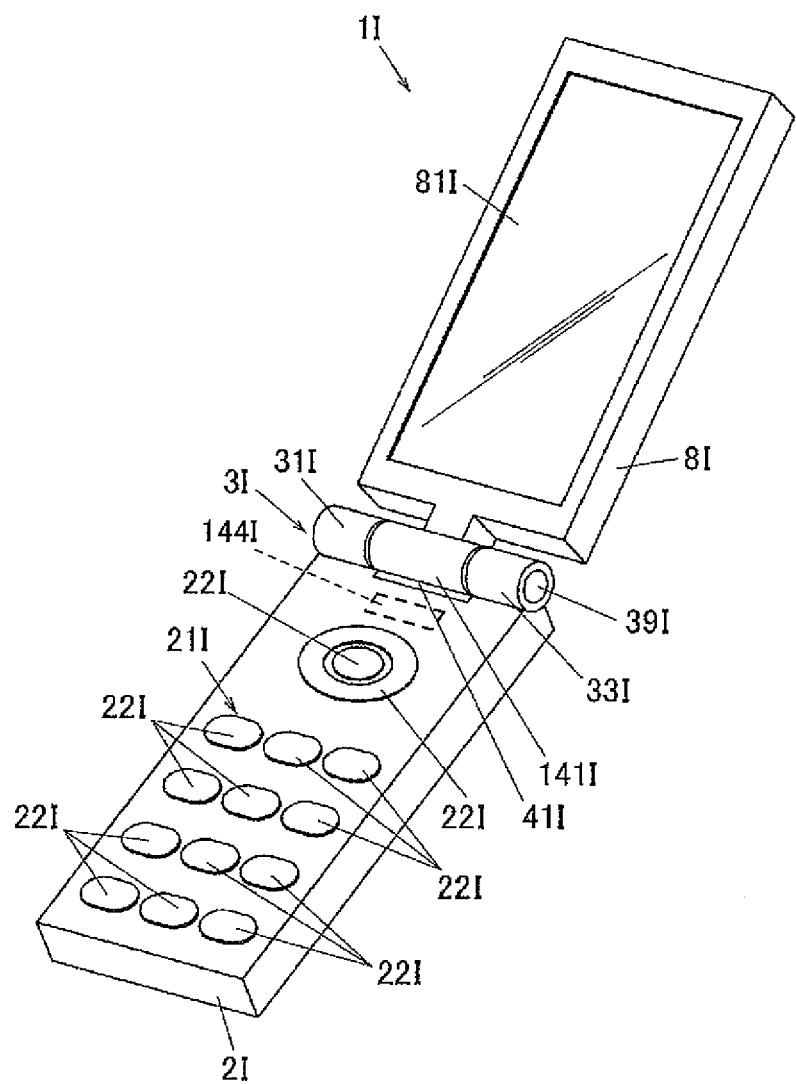
FIG. 34 is a perspective view showing an electronic device according to a tenth embodiment of the invention.
Figure 35A:
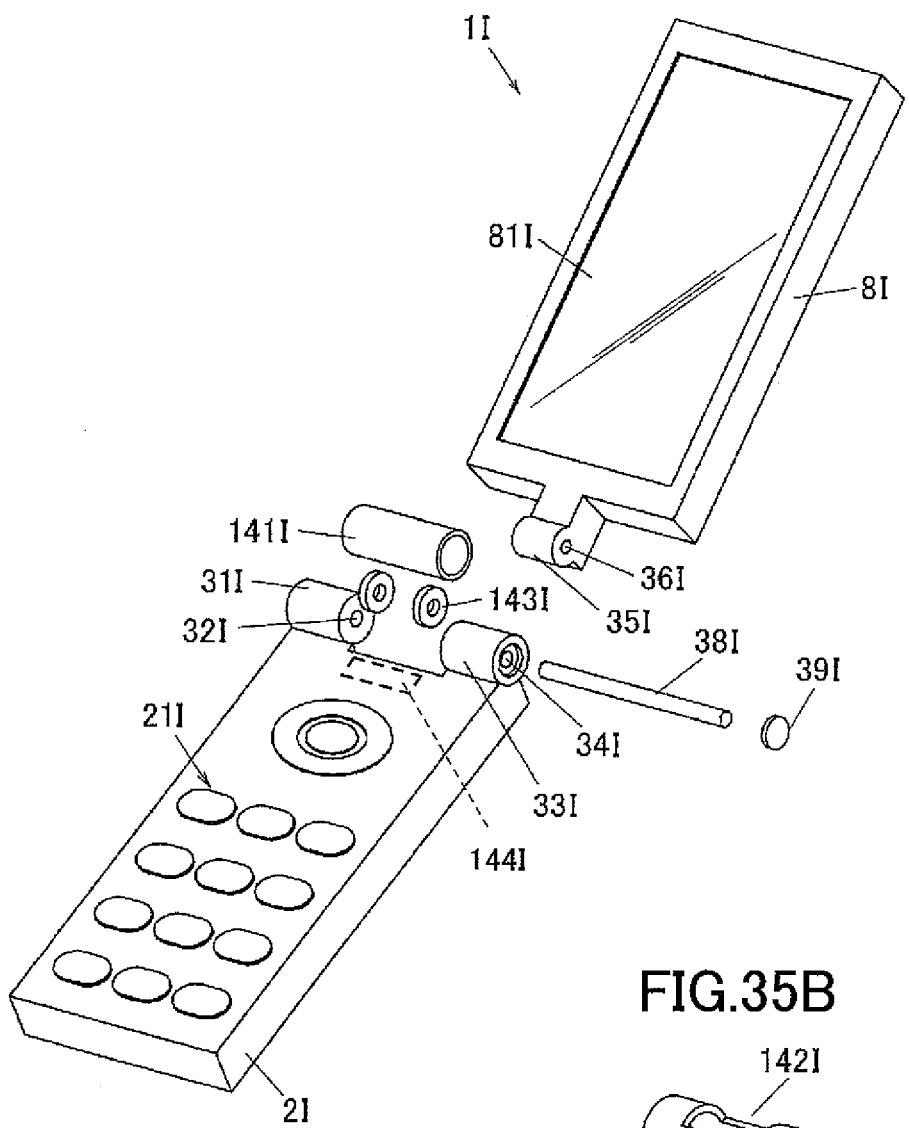
FIGS. 35A and 35B are exploded perspective views showing the electronic device according to the tenth embodiment.
Figure 35B:
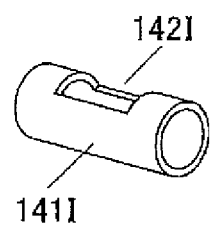
Figure 36:
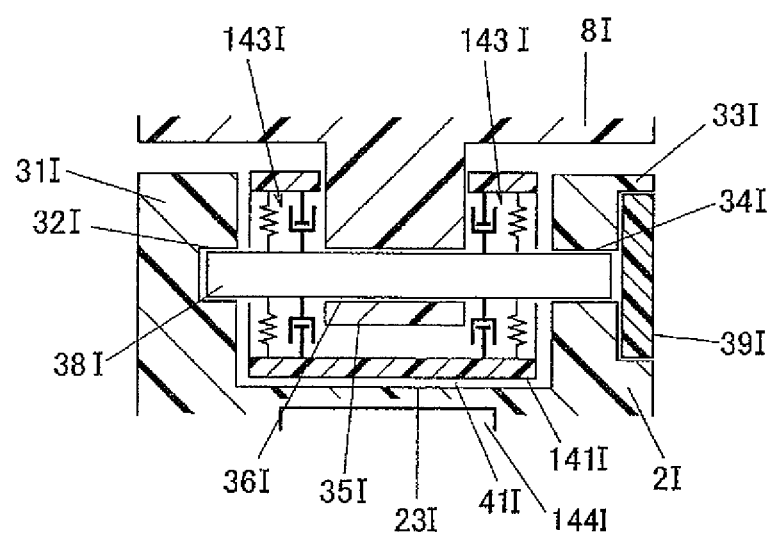
FIG. 36 is a cross-sectional view showing a hinge structure of the electronic device according to the tenth embodiment.

FIG. 34 is a perspective view showing an electronic device 1I. FIG. 35A is an exploded perspective view of a hinge structure 3I, and FIG. 35B is a perspective view showing a hinge cover 141I of the hinge structure 3I. FIG. 36 is a schematic diagram showing the cross-section of the hinge structure 3I along the rotational axial center thereof.

The hinge cover 141I is a cylindrical resin molded article, and has an opening 142I.

In the first casing 2I, a vibrator 144I is provided so as to be in proximity to, or in contact with, the hinge cover 144I. The vibrator may double as incoming-call alert vibrator.

An elastic ring 143I is a rubber molded article, and has an outside diameter equivalent to the inside diameter of the hinge cover 141I, and an inside diameter equivalent to the outside diameter of a pivot 38I.

A second rotational member 35I is inserted in the hinge cover 141I through the opening 142I, and is enclosed in the hinge cover 141I. It is to be noted that the circumferential surface of the second rotational member 35I and the inner surface of the hinge cover 141I are not fixed and have a clearance 41I therebetween.

The elastic ring 143I is inserted into the cylindrical portion of the hinge cover 141I from both ends.

The pivot 38I passes through a shaft hole 34I, one elastic ring 143I, a shaft hole 36I, the other elastic ring 143I, and a shaft hole 31I to couple the hinge structure 3I.

The rotation of the second rotational member 35I causes a second casing 8I to abut on the end face of the opening 142I, so that the hinge cover 141I rotates with the rotation of the second rotational member 35I.

The hinge cover 141I is elastically held at the pivot 38I by the elastic ring 143I, and always has a clearance with other elements, so that the hinge cover 141I can be elastically moved within a clearance 41I formed between the hinge cover 141I and a cylindrical surface 23I.

The hinge cover 141I can easily be moved manually for the cleaning purpose. The hinge cover 141I is vibrated by a vibrator (not shown) incorporated in a first casing 2I to easily discharge a foreign matter.

A spring elastic member, such as a spiral spring, may be used for the means that elastically holds the hinge cover 141I at the pivot 38I. The hinge cover 141I and the elastic ring 143I may be integrally formed of an elastic material, in which case cleaning becomes easier for the hinge cover 141I itself is deformable.

The vibrator may operate in conjunction with the operation of incoming call alert. Further, the position to dispose the vibrator 144I is not limited to the proximity to the hinge cover 141I, and can be arbitrary.

Any two or more of the above-described embodiments first to tenth can be combined.

Further, the timing for cleaning the mechanisms shown in the eighth and tenth embodiments can be irrelevant to the open or close of the electronic device, and injection or vibration may be performed for a predetermined time period triggered by a predetermined operation of a switch (or the operational unit 21I).

While the electronic devices 1 and 1A to 1I in the foregoing embodiments are cellular phones, the present invention may be adapted to a notebook type personal computer, a wearable personal computer, a digital still camera, a digital video camera, a PDA (Personal Digital Assistance), an electronic computer, an electronic calculator, an electronic notebook, a portable radio transmitter, a multi-function electronic device and other kinds of electronic devices.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-003278 filed on Jan. 10, 2008 and Japanese Patent Application No. 2008-315115 filed on Dec. 10, 2008 and including specification, claims, drawings and summary of each Japanese Patent Application. The disclosure of the above Japanese Patent Applications is incorporated herein by reference in their entirety.

What is claimed is:

1. A coupling device for movably coupling a first casing and a second casing, comprising:
   a first coupling member comprising a first rotational member provided at the first casing;
   a second coupling member comprising a second rotational member provided at the second casing and having a circumferential surface along a part of a top surface of the first casing, and coupled to the first rotational member such that the first casing and the second casing are movable relative to each other; and
   a cleaning mechanism configured to operatively remove foreign matter which has entered a clearance between the first casing and one of the second casing and the second rotational member, the cleaning mechanism including a wiper blade that operatively moves in the clearance with movement of the second casing to remove the foreign matter which has entered the clearance;
   wherein the first and second coupling members rotatably couple the first casing and the second casing;
   wherein the wiper blade is protrusively provided on the circumferential surface of the second rotational member and moves in the clearance between the first casing and the second coupling member with rotation of the second casing;
   wherein the second rotational member is covered with an elastic member having a circumferential surface along the part of the top surface of the first casing; and
   wherein the wiper blade is protrusively provided on the circumferential surface of the elastic member.

* * * * *